(12) United States Patent
Oh

(10) Patent No.: US 8,054,482 B2
(45) Date of Patent: Nov. 8, 2011

(54) LOCALITY PERMISSION BASED PRINTING

(75) Inventor: Ju-hyun Oh, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1051 days.

(21) Appl. No.: 11/475,105

(22) Filed: Jun. 27, 2006

(65) Prior Publication Data

US 2006/0290981 A1   Dec. 28, 2006

(30) Foreign Application Priority Data

Jun. 28, 2005  (KR) .................. 10-2005-0056501
Jul. 29, 2005  (KR) .................. 10-2005-0069669

(51) Int. Cl.
*G06K 15/00* (2006.01)
(52) U.S. Cl. ...................................... 358/1.14; 358/1.1
(58) Field of Classification Search ............... 283/72, 283/73; 358/1.14
See application file for complete search history.

(56) References Cited

U.S. PATENT DOCUMENTS

| | | | |
|---|---|---|---|
| 6,289,460 B1 | 9/2001 | Hajmiragha | |
| 7,180,621 B2 * | 2/2007 | Clough et al. | 358/1.15 |
| 7,331,725 B2 * | 2/2008 | Troyansky et al. | 400/106 |
| 7,367,060 B2 * | 4/2008 | Someshwar | 726/27 |
| 2005/0039044 A1 * | 2/2005 | Gassho et al. | 713/201 |

FOREIGN PATENT DOCUMENTS

| | | |
|---|---|---|
| CN | 1613050 | 5/2005 |
| JP | 11-327439 | 11/1999 |
| JP | 2001-334728 | 12/2001 |
| JP | 2004-188960 | 7/2004 |
| JP | 2004-295528 | 10/2004 |
| JP | 2005-066875 | 3/2005 |
| KR | 10-2004-0040591 | 5/2004 |
| KR | 10-2005-0050497 | 5/2005 |

* cited by examiner

*Primary Examiner* — Benny Tieu
*Assistant Examiner* — Eric A Rust
(74) *Attorney, Agent, or Firm* — Roylance, Abrams, Berdo & Goodman, L.L.P.

(57) ABSTRACT

A method of managing data contained in a file includes extracting locality information contained in a printing data file; determining whether the same locality information exists between the extracted locality information and input locality information; and analyzing printing data contained in the printing data file if it is determined that the same locality information exists. A method of managing data contained in a document includes extracting locality information by reading a document; determining whether the same locality information exists between the extracted locality information and input locality information; and duplicating information contained in the document if it is determined that the same locality information exists.

32 Claims, 17 Drawing Sheets

FIG. 5A

```
<?xml version="x.x" encoding="xxxxxxxxx"?>
<LocalityInfo>
   <InfoType>GPS</InfoType>
   <DataType>4 Point GPS Positions</DataType>
   <Data>
      <Data1>xxxxx.xxxxx</Data1>
      <Data2>xxxxx.xxxxx</Data2>
      <Data3>xxxxx.xxxxx</Data3>
      <Data4>xxxxx.xxxxx</Data4>
   </Data>
</LocalityInfo>
```

FIG. 5B

```
<?xml version="x.x" encoding="xxxxxxxxx"?>
<LocalityInfo>
   <InfoType>Celluar</InfoType>
   <DataType>Cell ID</DataType>
   <Data>
       <Data1>xxxx</Data1>
       <Data2>xxxxx</Data2>
       <Data3>xxxxx</Data3>
       <Data4>xxxxx</Data4>
   </Data>
</LocalityInfo>
```

FIG. 5C

```xml
<?xml version="x.x" encoding="xxxxxxxx"?>
<LocalityInfo>
   <InfoType>Building</InfoType>
   <DataType>Building ID</DataType>
      <PositionDataType>ID</PositionDataType>
      <Data>
      <Data1>xxxx</Data1>
      <Data2>xxxxx</Data2>
      <Data3>xxxxx</Data3>
      <Data4>xxxxx</Data4>
      </Data>
</LocalityInfo>
```

FIG. 5D

```xml
<?xml version="x.x" encoding="xxxxxxxx"?>
<LocalityInfo>
   <InfoType>MFP Mac Address</InfoType>
   <DataType>Mac Address</DataType>
   <Data>
      <Data1>xx:xx:xx:xx:xx:xx:xx:xx</Data1>
      <Data2>xx:xx:xx:xx:xx:xx:xx:xx</Data2>
   </Data>
</LocalityInfo>
```

FIG. 6

```
<docinfo>
<title>Document Title</title>
<author>Jhone Doe</author>
<created>yyyy-mm-dd,hh-mm-ss</created>
<modified>yyyy-mm-dd,hh-mm-ss</modified>
<docnumber>nnnn</docnumber>
<description>Description of this file</description>
</docinfo>
<contactinfo>
<docmanger>Jhone Doe</docmanager>
<telephone>nnn-nnn-nnnn</telephone>
<email>jdoe@domain.com</email>
</contactinfo>
```

US 8,054,482 B2

LOCALITY PERMISSION BASED PRINTING

CROSS-REFERENCE TO RELATED PATENT APPLICATION

This application claims the benefit under 35 U.S.C. §119(a) of Korean Patent Application No. 10-2005-0056501, filed on Jun. 28, 2005 and No. 10-2005-0069669, filed on Jul. 29, 2005, in the Korean Intellectual Property Office, the entire disclosures of which are hereby incorporated by reference.

FIELD OF THE INVENTION

The present invention relates to data management. More particularly, the present invention relates to a data management method and apparatus for preventing an illegal outflow of data by allowing data contained in a file or document to be perceived only if the same locality information exists between locality information extracted from the file or document and input locality information.

DESCRIPTION OF THE RELATED ART

A conventional data management apparatus creates a printing data file by encrypting printing data using an authentication key prepared in advance. Here, the printing data may be document data or image data.

Since the printing data file created by the conventional data management apparatus is encrypted, a third party desiring to know content of the printing data must decrypt the printing data file. To decrypt the printing data file, the third party must know the authentication key used for encryption.

Unfortunately, if the authentication key used for the encryption is disclosed, anyone can know the content of the printing data from the conventional data management apparatus, and therefore, when the printing data file is removed from a secure location, security of the content of the printing data cannot be guaranteed, and an illegal outflow of the printing data is possible. In addition, conventional data management apparatuses do not allow a user to perceive the content of the printing data before the printing data file is decrypted.

A secured document can be created by inserting authentication information into printing data and printing the printing data having the authentication information inserted. When a certain document contains authentication information, the authentication information indicates that security is required when the certain document is removed from the secure location.

Authentication information may be inserted into printing data by being watermarked or represented as a bar code on a document. However, the authentication information only indicates that security is required when a secured document is removed from a secure location, and so, the secured document containing the authentication information can be duplicated anywhere without restriction.

Thus, based on the conventional data management apparatus, since a secured document can be duplicated at any location where a user creating a secured document does not want, security cannot be guaranteed when the secured document is removed from a secure location, and the secured document may be vulnerable to being illegally removed and copied.

SUMMARY OF THE INVENTION

Embodiments of the present invention provide a data management method of preventing an illegal outflow of data by allowing data contained in a file or document to be perceived only if the same locality information exists between locality information extracted from the file or document and input locality information.

The present invention provides a data management apparatus for preventing an illegal outflow of data by allowing data contained in a file or document to be perceived only if the same locality information exists between locality information extracted from the file or document and input locality information.

Embodiments of the present invention provide a computer readable recording medium comprising a computer program for preventing an illegal outflow of data by allowing data contained in a file or document to be perceived only if the same locality information exists between locality information extracted from the file or document and input locality information.

According to an aspect of the present invention, there is provided a data management method comprising (a) extracting locality information contained in a printing data file; (b) determining whether the same locality information exists between the extracted locality information and obtained locality information; and (c) analyzing printing data contained in the printing data file if it is determined that the same locality information exists.

The extracted locality information may be locality information of locations where an image of the printing data can be formed, and the obtained locality information may be locality information of a location where operation (c) is performed.

The method may further comprise (d) forming an image of the printing data. The method may further comprise (e) informing a user that the printing data cannot be analyzed if it is determined that the same locality information does not exist.

Operation (c) may comprise (c1) decrypting secured data contained in the printing data file if it is determined that the same locality information exists; and (c2) analyzing the printing data which is the decryption result, wherein the secured data is what the printing data is encrypted.

In operation (a), the extraction may be performed by decrypting the locality information contained in the printing data file, and the locality information contained in the printing data file may be encrypted.

If both the printing data and the locality information contained in the printing data file are encrypted, in operation (a), the extraction may be performed by decrypting the locality information contained in the printing data file using a first authentication key, and the locality information contained in the printing data file may be encrypted using the first authentication key, and in operation (c), the secured data may be decrypted using a second authentication key if it is determined that the same locality information exists, and the secured data is what the printing data is encrypted using the second authentication key, and the second authentication key may be different from the first authentication key. Metadata can be contained in the printing data file. Metadata is data containing information about the printing data.

According to another aspect of the present invention, there is provided a data management method comprising (a) generating locality information of locations where an image of printing data can be formed; and (b) creating a printing data file by inserting the generated locality information into the printing data.

Secured data and the locality information may be generated in operation (a), the printing data file may be created by inserting the generated locality information into the generated secured data in operation (b), and the secured data may be a result obtained by encrypting the printing data.

Operation (a) may further comprise encrypting the locality information, and in operation (b), the encrypted locality information may be inserted into the secured data.

In operation (a), the generated locality information may be encrypted using a first authentication key, the printing data may be encrypted using a second authentication key, and the first authentication key may be different from the second authentication key.

Operation (b) may comprise (b1) inserting the generated locality information into the generated secured data; and (b2) inserting metadata into the insertion result. Metadata is data containing information about the printing data.

According to another aspect of the present invention, there is provided a data management method comprising extracting locality information by reading a document; determining whether the same locality information exists between the extracted locality information and obtained locality information; and duplicating information contained in the document if it is determined that the same locality information exists.

According to another aspect of the present invention, there is provided a data management method comprising inserting locality information into printing data; and printing the printing data into which the locality information is inserted.

According to another aspect of the present invention, there is provided a data management apparatus comprising a locality information extractor for extracting locality information contained in a printing data file; an examiner for determining whether the same locality information exists between the extracted locality information and obtained locality information; and a printing data analyzer for analyzing printing data contained in the printing data file in accordance with the determination result.

According to another aspect of the present invention, there is provided a data management apparatus comprising a locality information generator for generating locality information of locations where an image of printing data can be formed; and a locality information insertion unit for creating a printing data file by inserting the generated locality information into the printing data.

According to another aspect of the present invention, there is provided a data management apparatus comprising a locality information extractor for extracting locality information by reading a document; an examiner for determining whether the same locality information exists between the extracted locality information and obtained locality information; and a duplication unit for duplicating information contained in the document if it is determined that the same locality information exists.

According to another aspect of the present invention, there is provided a data management apparatus comprising a locality information insertion unit for inserting locality information into printing data; and an image forming unit for printing the locality information inserted printing data.

According to another aspect of the present invention, a computer readable recording stores a computer program for executing a data management method comprising extracting locality information contained in a printing data file; determining whether the same locality information exists between the extracted locality information and obtained locality information; and analyzing printing data contained in the printing data file if it is determined that the same locality information exists.

According to another aspect of the present invention, a computer readable recording medium stores a computer program for executing a data management method comprising generating locality information of locations where an image of printing data can be formed; and creating a printing data file by inserting the generated locality information into the printing data.

According to another aspect of the present invention, a computer readable recording medium stores a computer program for executing a secured document management method comprising extracting locality information by reading a document; determining whether the same locality information exists between the extracted locality information and obtained locality information; and duplicating information contained in the document if it is determined that the same locality information exists.

BRIEF DESCRIPTION OF THE DRAWINGS

The above and other features and advantages of exemplary embodiments of the present invention will become more apparent from the following detailed description in connection with the attached drawings in which:

FIGS. 5A through 5D illustrate exemplary locality information obtained in FIG. 4 using an XML type;

FIG. 6 is a diagram illustrating exemplary metadata using an XML type;

DETAILED DESCRIPTION OF EXEMPLARY EMBODIMENTS

Exemplary embodiments of the present invention will now be described in more detail with reference to the accompanying drawings. Data managed according to an exemplary embodiment of the present invention may be contained in a file or a document of a paper type, and therefore the two cases, for example, will be described.

When data to be managed is contained in a file, a data management method and apparatus according to an exemplary embodiment of the present invention will be described with reference to FIGS. 1 through 12. Here, the data to be managed may be printing data, and the file containing the data to be managed may be called a printing data file.

When data to be managed is contained in a document, a data management method and apparatus according to an exemplary embodiment of the present invention will be described with reference to FIGS. 13 through 16. As used herein, the data to be managed will be referred to as information to be managed, and the document containing the data to be managed will be referred to as a secured document.

Figure 1:
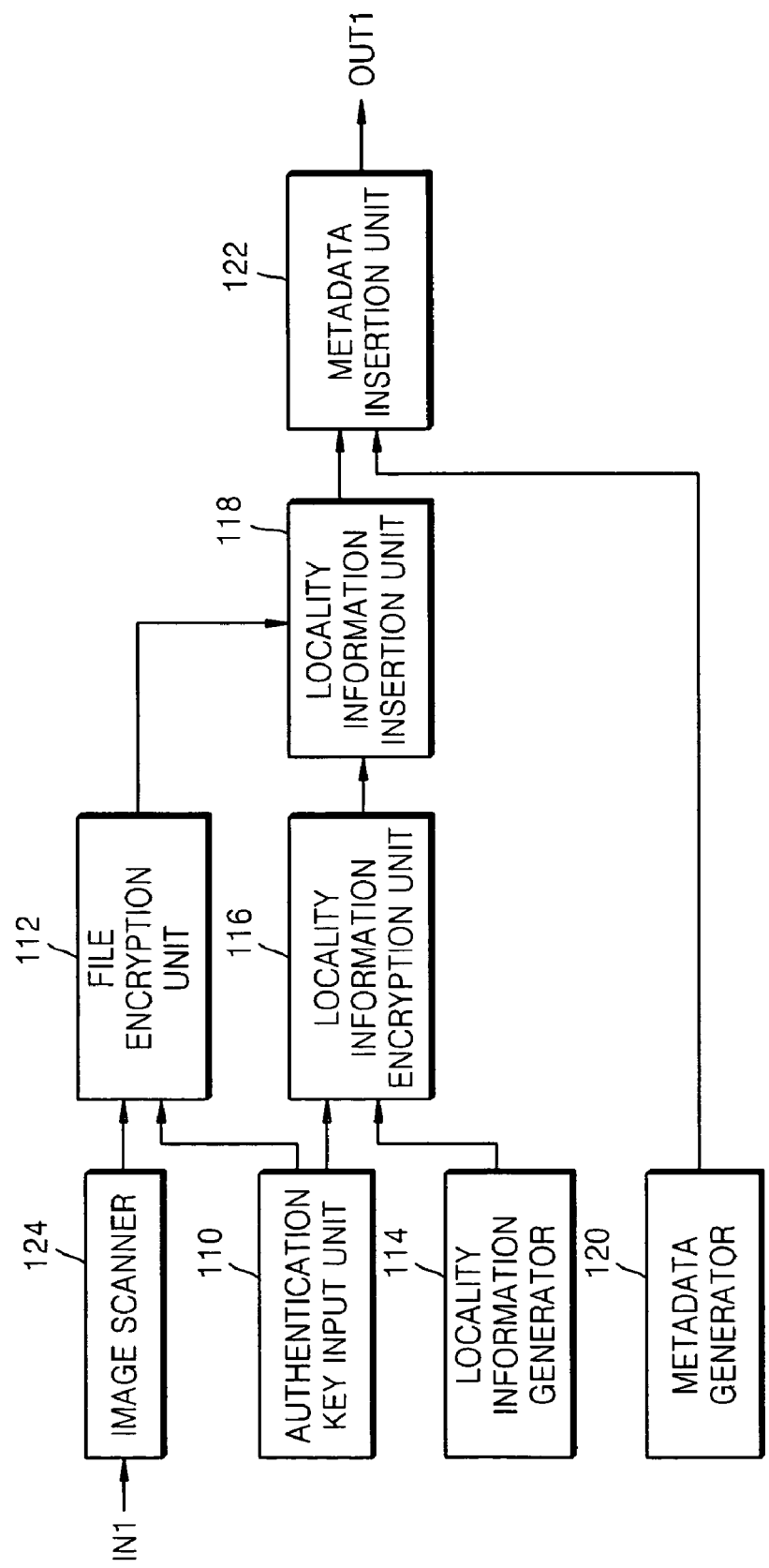
FIG. 1 is a block diagram of a data management apparatus for creating a printing data file according to an exemplary embodiment of the present invention.

FIG. 1 is a block diagram of a data management apparatus for explaining how to create a printing data file, according to an exemplary embodiment of the present invention. Referring to FIG. 1, the data management apparatus includes an authentication key input unit 110, a file encryption unit 112, a locality information generator 114, a locality information encryption unit 116, a locality information insertion unit 118, a metadata generator 120, a metadata insertion unit 122, and an image scanner 124.

A printing data file managed by the data management apparatus indicates a file requiring security. In more detail, the printing data file managed by the data management apparatus indicates a file created by processing printing data so that only an authorized user can access content of the printing data.

An exemplary printing data file managed by the data management apparatus comprises locality information and the printing data. In this case, the printing data file indicates printing data into which locality information is inserted. The locality information inserted into the printing data indicates locality information of locations where an image of the printing data is authorized to be formed. For example, when printing data into which locality information of locations a, c, and d is inserted is input to a certain image forming device, locality information obtained by the image forming device must exist in the locality information inserted into the printing data in order for the image forming device to print the printing data. Thus, if the image forming device is located at a location b, and therefore, if locality information of b is obtained by the image forming device as the locality information of the image forming device, the image forming device cannot print the printing data.

As a result, even if neither the printing data nor the locality information are encrypted, the printing data cannot be printed at any location other than locations a, c, and d. That is, the printing data into which the locality information is inserted can keep security, and therefore the printing data into which the locality information is inserted can be called a printing data file.

On the other hand, the printing data file can be comprised of metadata, encrypted locality information, and encrypted printing data. That is, to keep more perfect security, the locality information and the printing data contained in the printing data file may be encrypted locality information and encrypted printing data. In this case, each of the locality information and the printing data may be encrypted using an authentication key. In more detail, the locality information may be encrypted using a first authentication key, and the printing data may be encrypted using a second authentication key.

FIG. 1 illustrates an exemplary data management apparatus for creating a printing data file comprising metadata, encrypted locality information, and encrypted printing data. Thus, if the data management apparatus illustrated in FIG. 1 creates a printing data file comprising non-encrypted locality information and non-encrypted printing data, the authentication key input unit 110, the file encryption unit 112, the locality information encryption unit 116, the metadata generator 120, and the metadata insertion unit 122 may be omitted from the illustration of FIG. 1.

The components shown in FIG. 1 will now be described. That is, the description of FIG. 1 described below relates to a printing data file of which both printing data and locality information are encrypted.

The authentication key input unit 110 receives at least one of the first authentication key and the second authentication key. The first authentication key is used for encryption of locality information, and the second authentication key is used for encryption of printing data. When the printing data and the locality information contained in a printing data file are not encrypted, the authentication key input unit 110 may be omitted from the data management apparatus.

The encrypted printing data is called secured data.

The first authentication key preferably is also used for decryption of the encrypted locality information, and the second authentication key preferably is used for decryption of the secured data. The first authentication key may be different from the second authentication key. Also, as can be appreciated, in an asymmetric encryption process, the decryption keys may be different than the enception keys.

The file encryption unit 112 can encrypt input printing data using the second authentication key input through the authentication key input unit 110. Here, IN1 denotes the input printing data. Thus, the file encryption unit 112 generates secured data.

The locality information generator 114 generates locality information of one or more locations where the secured data is authorized to be decrypted. To do this, the locations where the secured data can be decrypted may be pre-defined or predetermined That is, the locality information generator 114 generates the locality information of defined or predetermined locations.

The locality information generator 114 can obtain locality information of a location where the locality information generator 114 is located and output more than one locality information prepared in advance by matching the obtained locality information thereto. A preferred example of routes for the locality information generator 114 to obtain the locality information of the location where the locality information generator 114 is located will be described with reference to FIG. 4 to be described in more detail below.

The locality information encryption unit 116 encrypts the locality information generated by the locality information generator 114 using the first authentication key input through the authentication key input unit 110. That is, the locality information encryption unit 116 generates encrypted locality information.

The locality information insertion unit 118 inserts the encrypted locality information into the secured data generated by the file encryption unit 112.

The metadata generator 120 generates metadata to be contained in the printing data file. The metadata contains information about the printing data. For example, the metadata can contain information on contents of the printing data and arbitrary information on a manager of the printing data.

Information on the contents of the printing data can include, for example, a title, an author, a creation time, a final modification time, a management number, and schematic contents of the printing data, although the information is not limited to these exemplary items.

Information on the manager of the printing data can include, for example, a name, a telephone number, and an email address of the manager.

The metadata insertion unit 122 creates a printing data file by inserting the generated metadata into the result output from the locality information insertion unit 118. The result output from the locality information insertion unit 118 is the secured data into which the encrypted locality information is inserted. Here, OUT1 denotes the generated printing data file.

When IN1 is not printing data but a hardcopy type document, the data management apparatus may include image scanner 124.

The image scanner 124 generates image data by scanning the document. As used herein, when IN1 is a file, the printing data is referred to as document data, and when IN1 is a hardcopy type document, the printing data is referred to as image data.

Figure 2:
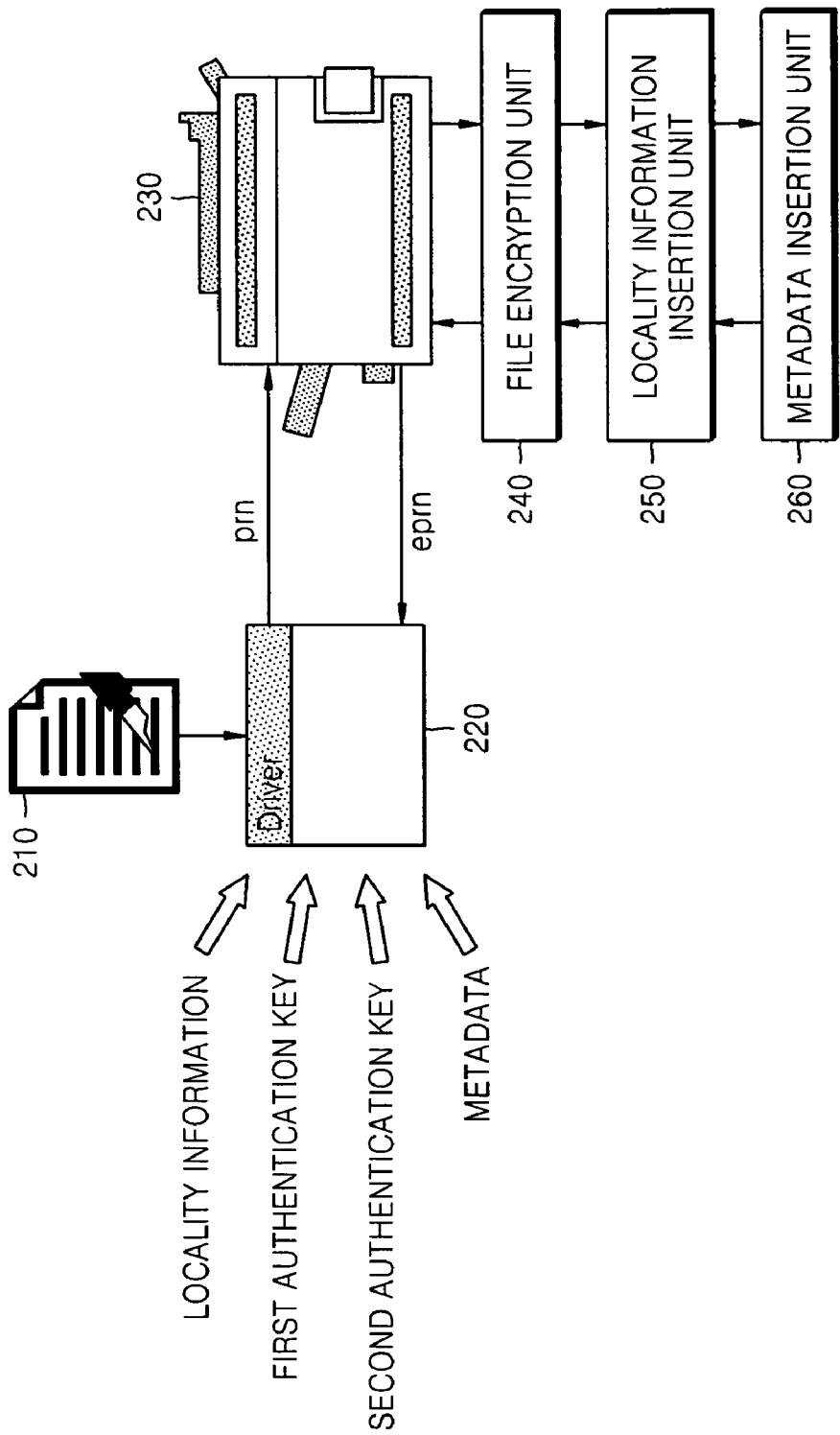
FIGS. 2 and 3 are reference diagrams for explaining the data management apparatus of FIG. 1.

FIG. 2 is a reference diagram for explaining the data management apparatus of FIG. 1. Reference numerals 210, 220, and 230 denote document data, a driver, and an image forming device, respectively. Reference numerals 240, 250, and 260 denote the components denoted by reference numerals 112, 118, and 122 of FIG. 1.

The document data may be a file of any type, which can be created using a file printing function. That is, the document data may be a file of a type which can be directly output from the image forming device 230. The driver 220 may be installed in a host device (not shown) connected to the image forming device 230. In this case, the image forming device 230 is a peripheral of the host device. A printer or a multi-function peripheral (MFP) can be the image forming device 230.

All of the document data 210, the first and second authentication keys input through the authentication key input unit 110, the locality information generated by the locality information generator 114, and the metadata generated by the metadata generator 120 are provided to the driver 220.

The driver 220 provides all of the received document data 210, first and second authentication keys, locality information, and metadata to the image forming device 230. The image forming device 230 may include the file encryption unit 240, the locality information encryption unit 116, the locality information insertion unit 250, and the metadata insertion unit 260.

In this case, the file encryption unit 240 generates secured data by encrypting the document data 210, and the locality information encryption unit 116 encrypts locality information. The locality information insertion unit 250 inserts the encrypted locality information into the secured data, and the metadata insertion unit 260 inserts metadata into the secured data into which the encrypted locality information is inserted.

A printing data file created by the metadata insertion unit 260 is transmitted to the driver 220. The printing data may be a file having an extension of "prn", and the transmitted printing data file may be a file having an extension of "eprn (encrypted prn)".

If a printing data file managed by the data management apparatus is comprised of non-encrypted locality information and non-encrypted printing data, the first authentication key, the second authentication key, and the metadata of FIG. 2 are not provided to the driver 220, and the data management apparatus of FIG. 2 may not include the file encryption unit 240 and the metadata insertion unit 260.

Figure 3:
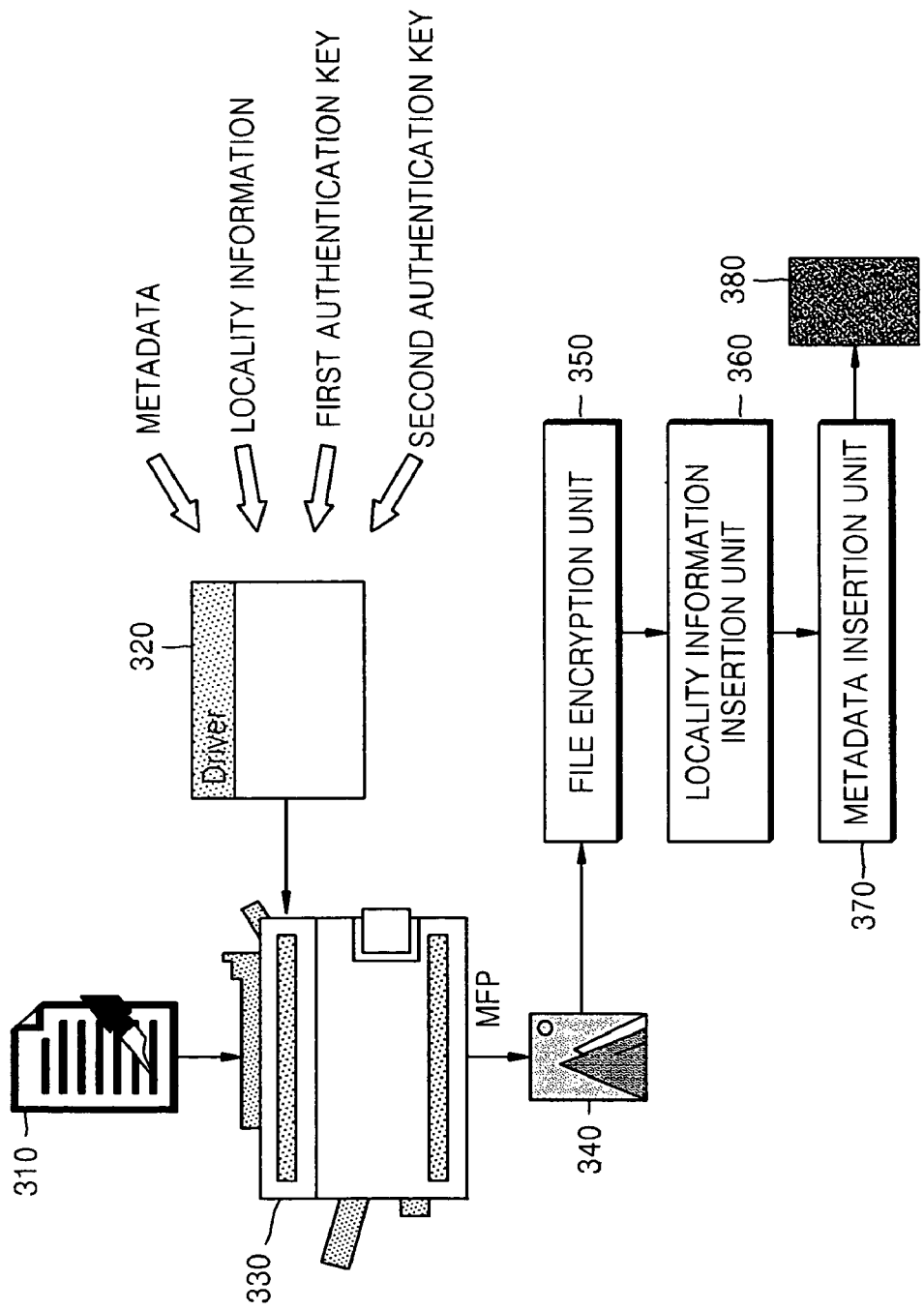

FIG. 3 is another reference diagram for explaining the data management apparatus of FIG. 1. Reference numerals 310, 320, 330, and 340 denote a hardcopy type document, a driver, an image forming device, and image data, respectively. Reference numerals 350, 360, and 370 denote the components denoted by reference numerals 112, 118, and 122 of FIG. 1.

The driver 320 may be installed in a host device (not shown) connected to the image forming device 330. In this case, the image forming device 330 is a peripheral of the host device. A printer or a multi-function peripheral (MFP) can be the image forming device 330.

All of the first and second authentication keys input through the authentication key input unit 110, the locality information generated by the locality information generator 114, and the metadata generated by the metadata generator 120 are provided to the driver 320.

The driver 320 provides all of the received first and second authentication keys, locality information, and metadata to the image forming device 330. The image forming device 330 may include the image scanner 124, the file encryption unit 350, the locality information encryption unit 116, the locality information insertion unit 360, and the metadata insertion unit 370.

In this case, the image scanner 124 generates the image data 340 by scanning the document 310, the file encryption unit 350 generates secured data by encrypting the image data 340, and the locality information encryption unit 116 encrypts locality information. The locality information insertion unit 360 inserts the encrypted locality information into secured data, and the metadata insertion unit 370 inserts metadata into the secured data into which the encrypted locality information is inserted. Then, a printing data file 380 is created.

If a printing data file managed by the data management apparatus is comprised of non-encrypted locality information and non-encrypted printing data, the first authentication key, the second authentication key, and the metadata of FIG. 3 are not provided to the driver 320, and the data management apparatus of FIG. 3 may not include the file encryption unit 350 and the metadata insertion unit 370.

Figure 4:
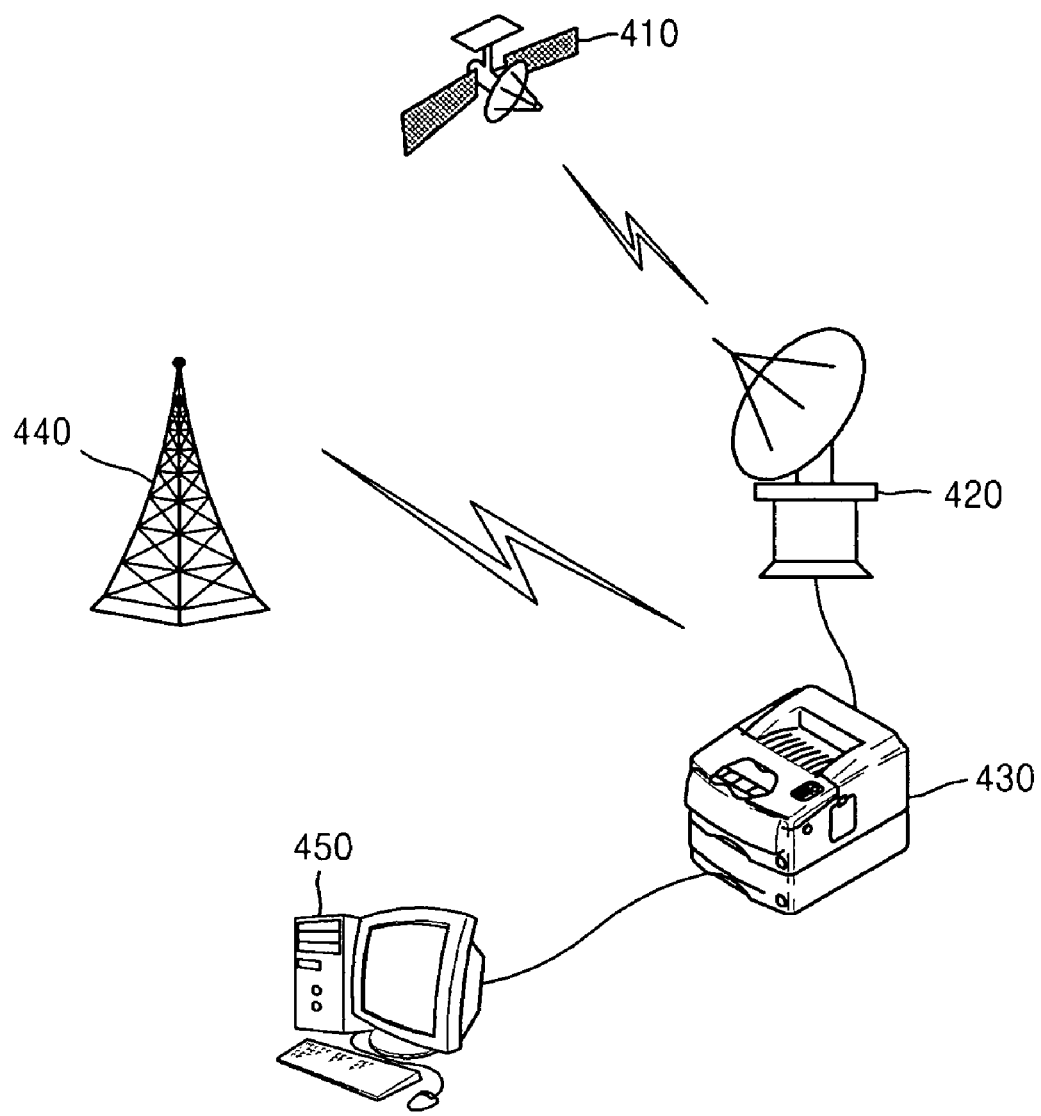
FIG. 4 is a reference diagram for explaining locality information in accordance with an exemplary embodiment of the present invention.

FIG. 4 is a reference diagram for explaining routes through which locality information can be obtained. As described in FIG. 1, the locality information generator 114 generates locality information of a location where secured data can be decrypted (hereinafter, target locality information).

In more detail, the locality information generator 114 may generate locality information determined by the user as target locality information, or may obtain locality information of a location where the locality information generator 114 is located and generate the obtained locality information as the target locality information. The determined or obtained locality information can be called initial locality information.

The target locality information may include the initial locality information and extended locality information. The extended locality information is locality information of a predetermined location in correspondence with the initial locality information. If the extended locality information matching the initial locality information is databased in advance, the locality information generator 114 can generate not only the initial locality information but also the extended locality information matching the initial locality information as the target locality information.

As described in FIGS. 1 through 3, in a host device 450 including the driver 220 or 320 and an image forming device 430 connected to the host device 450 via a network and including the locality information generator 114, the file encryption unit 112, the locality information encryption unit 116, the locality information insertion unit 118, and the metadata insertion unit 122, the initial locality information can be generated as described below.

The locality information of a location where the locality information generator 114 is located is locality information of the image forming device 430. The user who wants to determine the locality information of the image forming device 430 may determine the user's perceiving locality information as the locality information of the image forming device 430, or may search for locality information of the image forming device 430 in the network through the Internet 450 (such as, for example, the world wide web) and determine the locality information of the image forming device 430 using the search result as illustrated in FIG. 4.

The locality information generator 114 may obtain locality information thereof by itself. That is, the image forming device 430 including the locality information generator 114 may obtain locality information thereof by itself. To do this, the data management apparatus may include a locality information creator (not shown).

The locality information creator creates locality information of the image forming device 430. Such a locality information creator (not shown) may be included in a global positioning system (GPS) satellite 410 or a cell phone antenna 440.

For example, the locality information creator included in the GPS satellite 410 correctly detects a location of the image forming device 430 on the earth and creates information on the detected location. In this case, the image forming device 430 may include a GPS receiver (not shown). The GPS receiver receives the created information on the detected location from the GPS satellite 410 as locality information and transmits the received locality information to the locality information generator 114, and then the locality information generator 114 generates initial locality information using the received locality information.

In this case, the GPS receiver may directly receive the locality information from the GPS satellite 410 or may receive the locality information from the GPS satellite 410 via an antenna 420 connected to the image forming device 430.

Likewise, the locality information creator included in the cell phone antenna 440 correctly detects a location of the image forming device 430 in a cell phone network and creates information on the detected location. The cell phone network is typically constructed of a plurality of cells, and a cell phone antenna included in each cell typically has a unique cell ID. Thus, the locality information creator included in the cell phone antenna 440 of a cell in which the image forming device 430 is located outputs a unique cell ID of the cell as locality information of the image forming device 430. The locality information generator 114 included in the image forming device 430 receives the locality information and generates initial locality information using the received locality information.

If extended locality information matches the generated initial locality information as described above, the locality information generator 114 also generates the extended locality information as the target locality information. By doing this, the locality information generator 114 can generate more than one location at which a printing data file can be decrypted.

For example, if initial locality information is locality information of an image forming device selected by the user among a plurality of image forming devices located on a third floor of a building A, and if the initial locality information contains extended locality information including locality information of all image forming devices in the building A and locality information of all image forming devices in a building C, the locality information generator 114 can generate target locality information including locality information of all image forming devices in the building A and locality information of all image forming devices in the building C. In this example, it is assumed that the same company works in the buildings A and C.

While the locality information generator 114 obtaining and generating locality information is included in the image forming device 430 as described above, the locality information generator 114 may be included in the host device 450 connected to the image forming device 430.

FIGS. 5A through 5D are diagrams representing locality information obtained as the initial locality information by the locality information generator 114 using an XML type.

As illustrated in FIG. 5A, the obtained locality information may be the locality information of the image forming device 430 on the earth, which is detected by the locality information creator included in the GPS satellite 410.

As illustrated in FIG. 5B, the obtained locality information may be the locality information of the image forming device 430 in the cell phone network, which is detected by the locality information creator included in the cell phone antenna 440.

As illustrated in FIG. 5C, the obtained locality information may be the locality information of a building where the image forming device 430 including the locality information generator 114 is located. As illustrated in FIG. 5D, the obtained locality information may be a media access control (MAC) address of the image forming device 430 including the locality information generator 114.

FIG. 6 is a diagram representing an example of metadata using an XML type.

As illustrated in FIG. 6; the metadata may include information about the contents of printing data and information on a manager of the printing data.

As described above, exemplary information on the contents of the printing data may include a title, an author, a creation time ("created"), a final modification time ("modified"), a management number ("document"), and schematic -contents ("description") of the printing data.

Here, yyyy, mm, dd, hh, mm, ss, and nn denote a year, a month, a date, an hour, a minute, a second, and a number, respectively.

Exemplary information on the manager of the printing data ("contact info") may include a name ("docmanager"), a telephone number ("telephone"), and an email address ("email") of the manager.

Figure 7A:
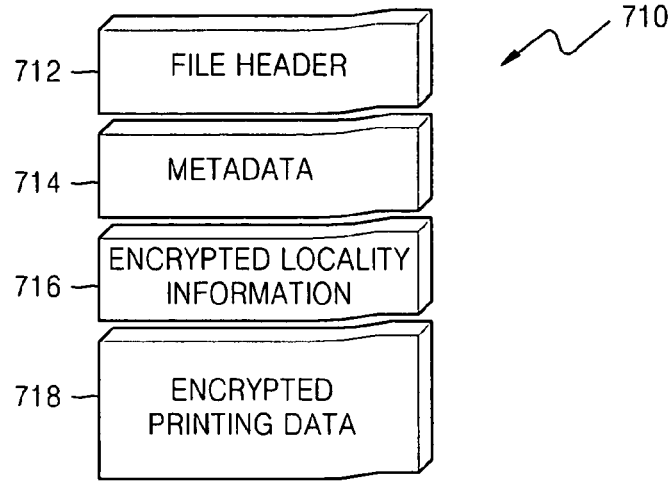
FIGS. 7A through 7D are structural diagrams of an exemplary printing data file created by the data management apparatus of FIG. 1.
Figure 7B:
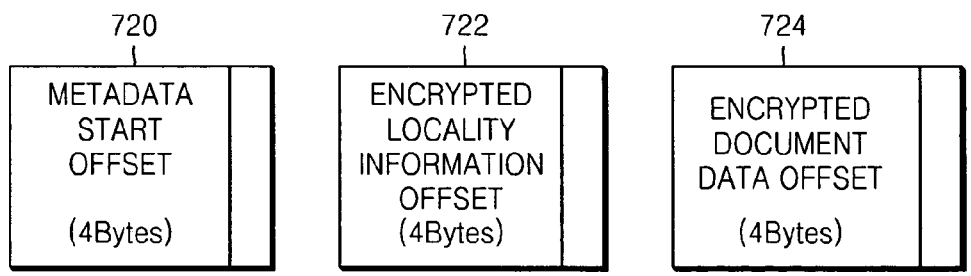
Figure 7C:
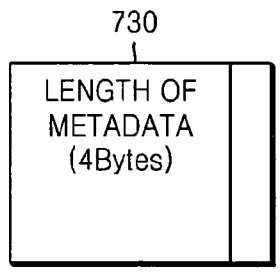
Figure 7D:
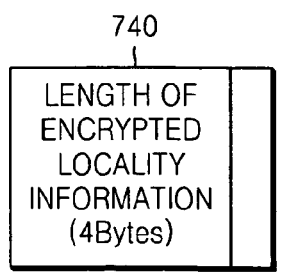

FIGS. 7A through 7D are structural diagrams of a printing data file 710 comprising metadata 714, encrypted locality information 716, and encrypted printing data 718, which is managed by the data management apparatus of FIG. 1. In more detail, FIG. 7A is a structural diagram of the printing data file 710, FIG. 7B is a structural diagram of a file header 712, FIG. .7C is a structural diagram of a header 730 of the metadata 714, and FIG. 7D is a structural diagram of a header 740 of the encrypted locality information 716.

As illustrated in FIG. 7A, when printing data is document data, the printing data file 710 includes the file header 712, the metadata 714, the encrypted locality information 716, and secured data, which is the encrypted printing data 718.

The file header 712 preferably includes information on offsets, which are relative addresses at which the metadata 714, the encrypted locality information 716, and secured data 718 are stored in a memory when the printing data file 710 is stored in the memory. That is, as illustrated in FIG. 7B, the file header 712 includes data on a metadata start offset 720, data on an encrypted locality information offset 722, and data on an encrypted document data offset 724.

As illustrated in FIG. 7C, the metadata 714 of the printing data file 710 includes a header 730 containing data indicating the length of the metadata 714.

As illustrated in FIG. 7D, the encrypted locality information 716 of the printing data file 710 includes a header 740 containing data indicating the length of the encrypted locality information 716.

Figure 8:
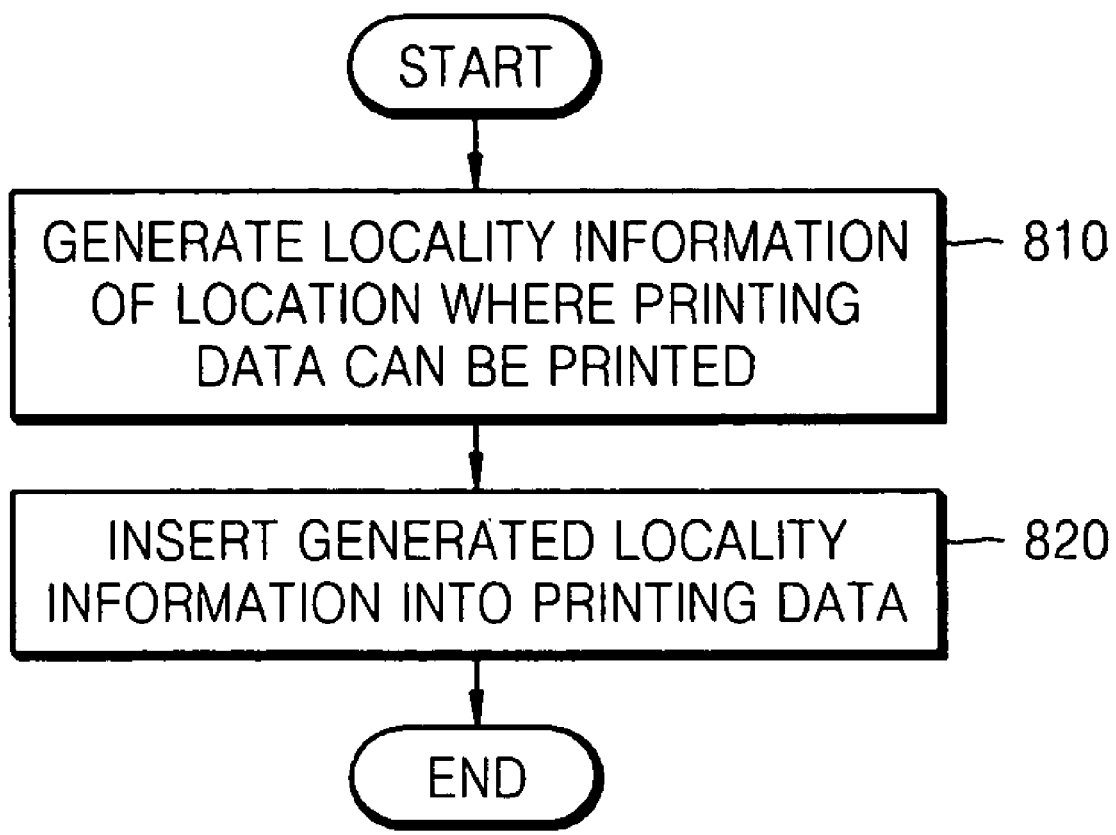
FIG. 8 is a flowchart of a method of creating a printing data file in the data management apparatus of FIG. 1, according to an exemplary embodiment of the present invention.

FIG. 8 is a flowchart of a method of creating a printing data file comprising non-encrypted locality information and non-encrypted printing data, which is managed by the data management apparatus of FIG. 1, according to an exemplary embodiment of the present invention.

The locality information generator 114 generates locality information of a location where printing data IN1 can be printed in operation 810, and the locality information insertion unit 118 creates a printing data file by inserting the generated locality information into the printing data IN1 in operation 820.

Figure 9:
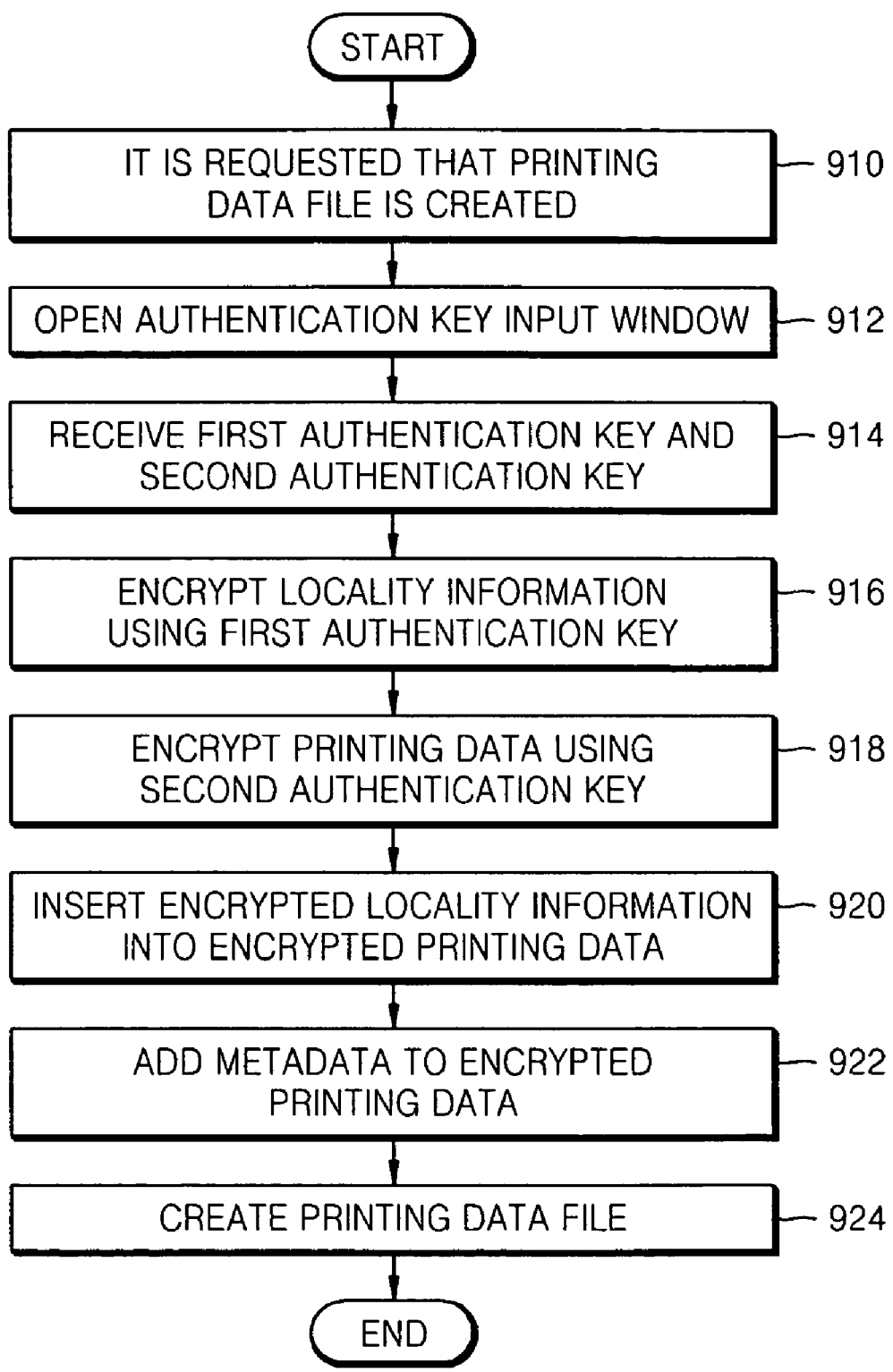
FIG. 9 is a flowchart of a method of creating a printing data file in a data management apparatus of FIG. 1, according to another exemplary embodiment of the present invention.

FIG. 9 is a flowchart of a method of creating a printing data file comprising metadata, encrypted locality information, and encrypted printing data, which is managed by the data management apparatus of FIG. 1, according to another exemplary embodiment of the present invention. The method comprises encrypting locality information using the first authentication key; encrypting printing data using the second authentication key; inserting the encrypted locality information into the encrypted printing data; and creating a printing data file by inserting metadata into the secured data (operations 910 through 924).

Referring to FIG. 9, the data management apparatus receives a command of creating a printing data file in operation 910, and then the authentication key input unit 110 opens an authentication key input window in operation 912. A user inputs the first authentication key and the second authentication key to the authentication key input unit 110 through the authentication key input window in operation 914.

The locality information encryption unit 116 encrypts locality information generated by the locality information generator 114 using the first authentication key in operation 916, and the file encryption unit 112 generates secured data by encrypting input document data using the second authentication key in operation 918.

The locality information insertion unit 118 inserts the encrypted locality information into the secured data in operation 920, and the metadata insertion unit 122 inserts metadata generated by the metadata generator 120 into the secured data into which the encrypted locality information has been inserted in operation 922. In operation 924, a printing data file managed by the data management apparatus is created through operations 910 to 922.

Figure 10:
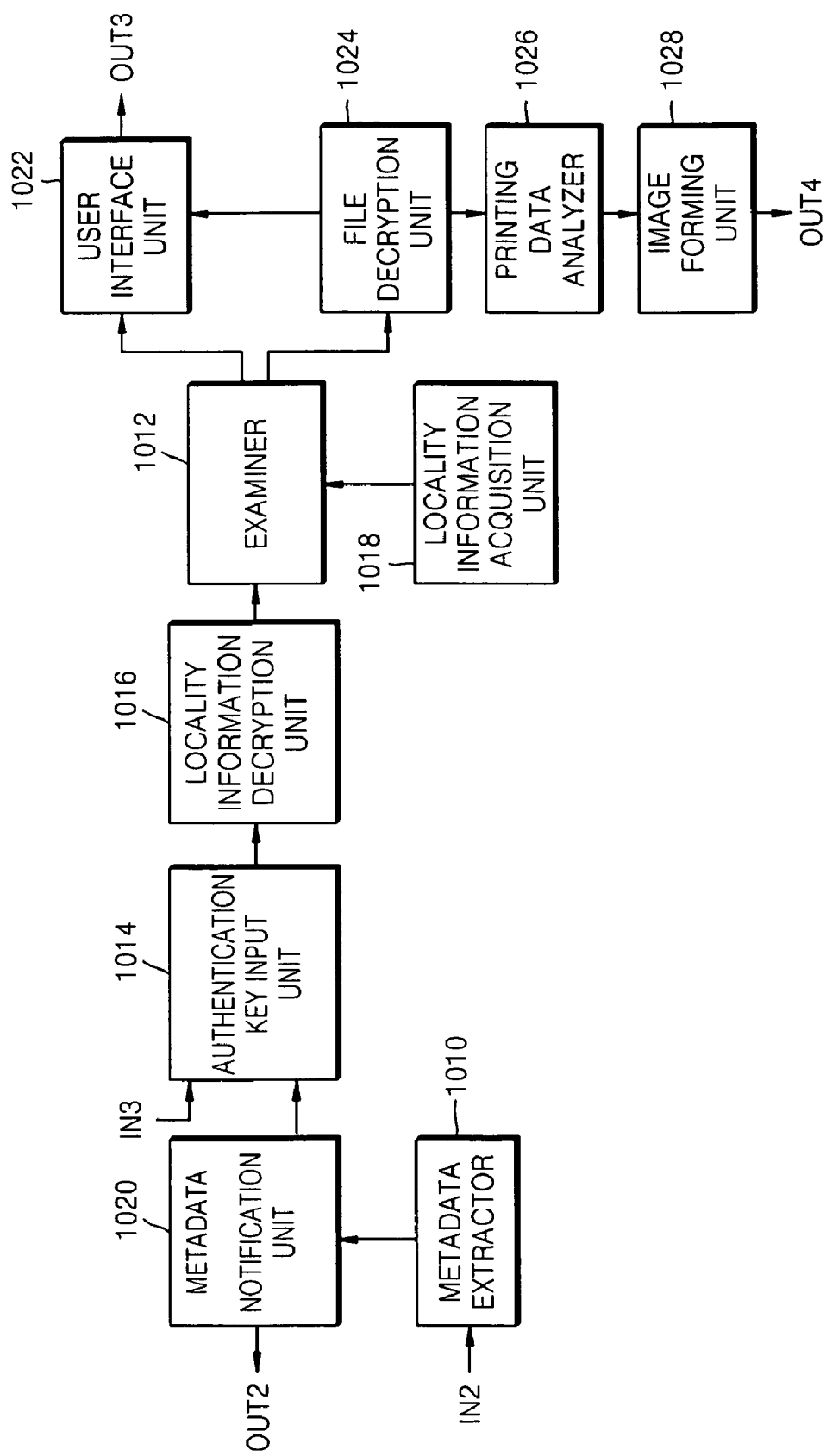
FIG. 10 is a block diagram of a data management apparatus for explaining how to manage data contained in a printing data file, according to an exemplary embodiment of the present invention.

FIG. 10 is a block diagram of a data management apparatus for explaining how to manage data contained in a printing data file, according to an exemplary embodiment of the present invention. The data management apparatus of FIG. 10 includes a metadata extractor 1010, a metadata notification unit 1012, an authentication key input unit 1014, a locality information decryption unit 1016, a locality information acquisition unit 1018, an examiner 1020, a user interface unit 1022, a file decryption unit 1024, a printing data analyzer 1026, and an image forming unit 1028.

Here, IN2 denotes a printing data file managed by the data management apparatus of the current embodiment, and in more detail, denotes OUT1 of FIG. 1.

The data management apparatus of FIG. 10 can receive a printing data file comprising metadata, encrypted locality information, and encrypted printing data and print printing data contained in the received printing data file.

Thus, in a case where the data management apparatus of FIG. 10 receives a printing data file comprising non-encrypted locality information and non-encrypted printing data and prints printing data contained in the received printing data file, the metadata extractor 1010, the metadata notification unit 1012, the authentication key input unit 1014, the locality information decryption unit 1016, and the file decryption unit 1024 can be omitted from FIG. 10. The components illustrated in FIG. 10 will now be described in further detail.

The metadata extractor 1010 extracts metadata contained in a received printing data file from the printing data file. The metadata notification unit 1012 notifies a user of contents of the extracted metadata. To do this, the metadata notification unit 1012 may include a user interface for displaying the contents of the extracted metadata.

In this case, the user interface included in the metadata notification unit 1012 notifies the user of schematic contents of printing data by displaying the contents of the extracted metadata. Here, OUT2 denotes contents displayed by the user interface included in the metadata notification unit 1012.

The authentication key input unit 1014 receives the first authentication key and the second authentication key. Here, IN3 may denote the first authentication key or the second authentication key. The first authentication key is used for decrypting encrypted locality information, and the second authentication key used for decrypting secured data.

That is, an authentication key used for encrypting locality information and an authentication key used for decrypting the locality information must be the same as the first authentication key, and an authentication key used for encrypting printing data and an authentication key used for decrypting the printing data must be the same as the second authentication key. Here, the first authentication key may be different from the second authentication key.

The locality information decryption unit 1016 decrypts the encrypted locality information using the first authentication key input through the. authentication key input unit 1014. By doing this, the locality information is available before the encrypted printing data is extracted. That is, if the authentication key input to the authentication key input unit 1014 to be used for decrypting the encrypted locality information is equal to the authentication key input to the authentication key input unit 110 of FIG. 1 to be used for encrypting the locality information, the locality information decryption unit 1016 extracts the locality information contained in the printing data file IN2.

Thus, the authentication key input unit 1014 and the locality information decryption unit 1016 operate as a locality information extractor (not shown). The extracted locality information is unencrypted locality information. If IN2 is OUT1 of FIG. 1, the extracted locality information is obtained by decrypting the encrypted target locality information contained in OUT1.

That is, locality information extracted by the locality information decryption unit 1016 indicates locality information of one or more locations where the secure data contained in the printing data file can be decrypted, and the locality information indicates the said target locality information.

Although the metadata extractor 1010 through the locality information decryption unit 1016 can be omitted from the data management apparatus of the current embodiment as described above when a printing data file managed by the data management apparatus of the current embodiment comprises non-encrypted locality information and non-encrypted printing data, the locality information extractor preferably exists in the data management apparatus to extract the locality information contained in the printing data file.

The locality information acquisition unit 1018 obtains locality information of a location where the locality information acquisition unit 1018 is located. The principle for the locality information acquisition unit 1018 to obtain the location where the locality information acquisition unit 1018 is located is the same as the principle for the locality information generator 114 of FIG. 1 to obtain the location where the locality information generator 114 is located.

The examiner 1020 determines whether the same locality information exists between the locality information obtained by the locality information acquisition unit 1018 and the locality information decrypted by the locality information decryption unit 1016.

If it is determined by the examiner 1020 that the same locality information does not exist, the user interface unit 1022 notifies a user that the secured data contained in the printing data file cannot be decrypted. For example, the user interface unit 1022 may display a message indicating that decryption is impossible. Here, OUT3 denotes contents notified by the user interface unit 1022.

On the other hand, if it is determined by the examiner 1020 that the same locality information exists, the file decryption unit 1024 decrypts the secured data contained in the printing data file using the second authentication key input through the authentication key input unit 1014.

If the authentication key input to the authentication key input unit 1014 to be used for decrypting the secured data is equal to the authentication key input to the authentication key input unit 110 of FIG. 1 to be used for encrypting the printing data, the file decryption unit 1024 generates printing data by decrypting the secured data.

The printing data analyzer 1026 analyzes contents of the printing data. The user interface unit 1022 may display the analyzed contents. The image forming unit 1028 forms an image depending on the analyzed contents; That is, the image forming unit 1028 forms an image of the printing data. Here, OUT4 denotes the printed printing data.

However, if the authentication key input to the authentication key input unit 1014 to be used for decrypting the secured data is different from the authentication key input to the authentication key input unit 110 of FIG. 1 to be used for encrypting the printing data; the file decryption unit 1024 commands the user interface unit 1022 to notify the user that the secured data cannot be decrypted.

Likewise, if the authentication key input to the authentication key input unit 1014 to be used for decrypting the encrypted locality information is different from the authentication key input to the authentication key input unit 110 of FIG. 1 to be used for encrypting the locality information, the locality information decryption unit 1016 commands the user interface unit 1022 to notify the user that the encrypted locality information cannot be decrypted.

Figure 11:
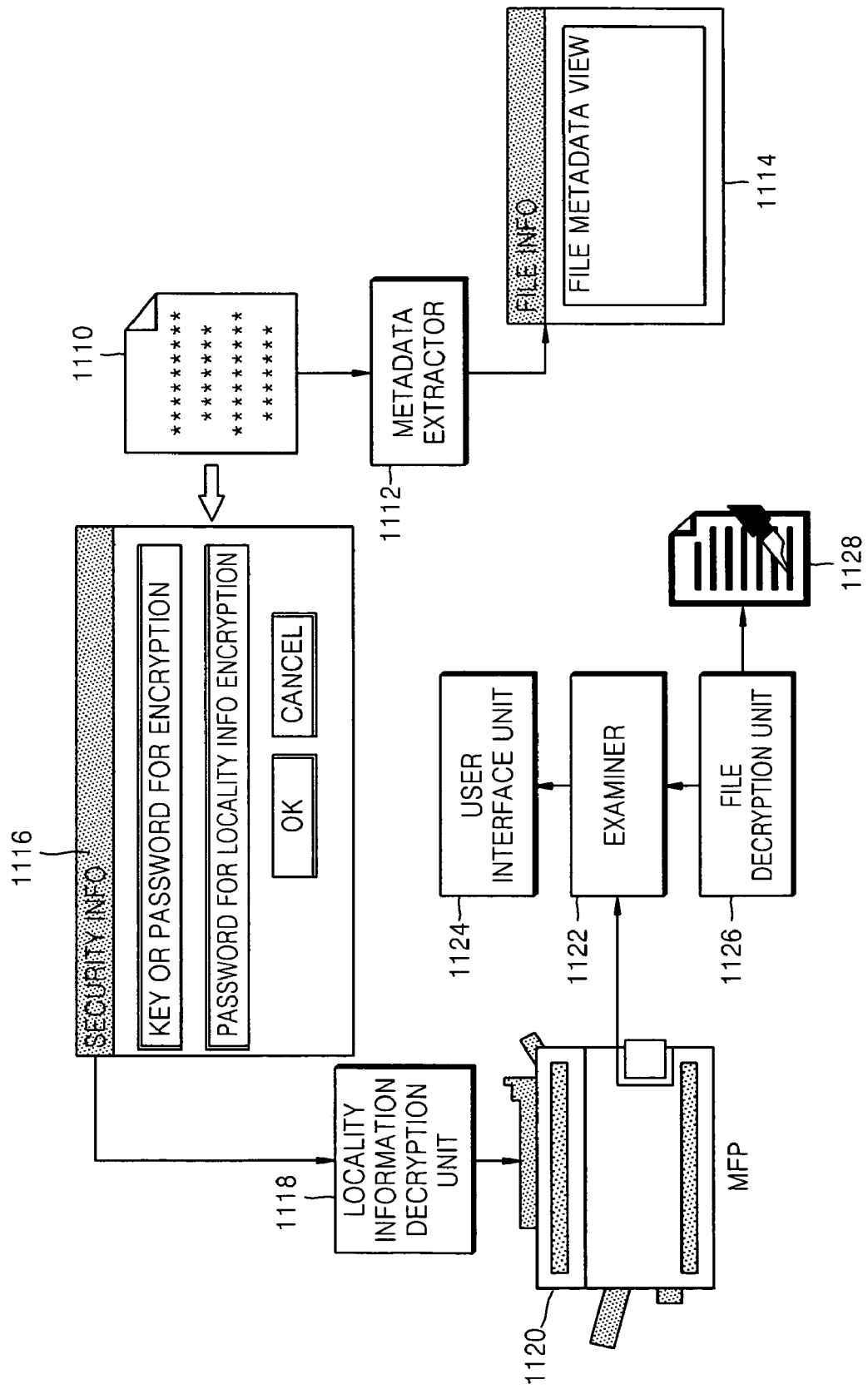
FIG. 11 is a reference diagram for explaining the data management apparatus of FIG. 10.

FIG. 11 is a reference diagram for explaining the data management apparatus of FIG. 10. Reference numeral 1110 denotes a printing data file, and reference numeral 1120 denotes an image forming device. Reference numerals 1112, 1118, 1122, 1124, and 1126 denote the components denoted by reference numerals 1010, 1016, 1020, 1022, and 1024 of FIG. 10.

A metadata extractor 1112 extracts metadata contained in the printing data file 1110. The metadata notification unit 1012 notifies a user of contents of the extracted metadata. For example, the metadata notification unit 1012 may display the contents of the extracted metadata using a user interface 1114 included- therein.

The metadata extractor 1112 is preferably included in a driver. The driver may be included in a host device (not shown) connected to the image forming device 1120. In this case, the image forming device is a peripheral of the host device.

A printer or an MFP can be an example of the image forming device 1120. A locality information decryption unit 1118, an examiner 1122, and a file decryption unit 1126 may be included in the image forming device 1120.

The authentication key input unit 1014 receives the first authentication key and the second authentication key through an authentication key input window 1116 included therein. The locality information decryption unit 1118 included in the driver decrypts encrypted locality information using the first authentication key input through the authentication key input unit 1014.

The examiner 1122 determines whether the same locality information exists between the locality information obtained by the locality information acquisition unit 1018 and the locality information decrypted by the locality information decryption unit 1118.

If it is determined by the examiner 1122 that the same locality information does not exist, a user interface unit 1124 notifies a user that the secured data cannot be decrypted. The user interface unit 1124 may be included in the driver.

The user interface unit 1124 may display details of the user who has requested the decryption. If a log-in ID and a log-in password are needed to use the host device, details of a user who has requested an illegal outflow of printing data can be traced.

That is, the user interface unit 1124 may display details of a log-in user when the examiner 1122 determines that the same locality information does not exist. In this case, the examiner 1122 may inform a manager of the printing data of the details of the log-in user.

If it is determined by the examiner 1122 that the same locality information exists, the file decryption unit 1126 generates printing data by decrypting the secured data. The image forming device 1120 including the file decryption unit 1126 may print the generated printing data and/or display contents of the generated printing data on a user display unit.

Figure 12:
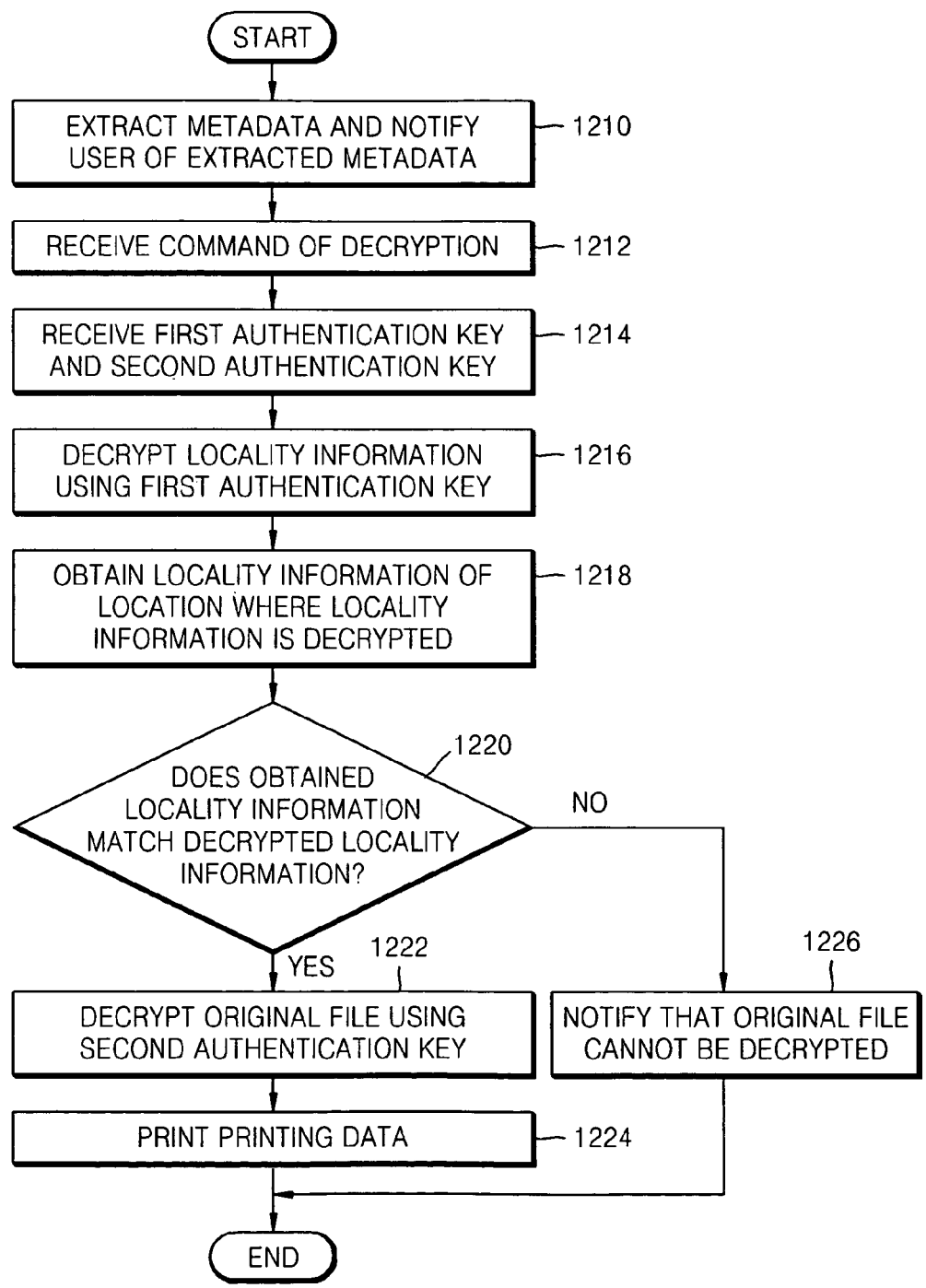
FIG. 12 is a flowchart of a method of managing data contained in a printing data file in the data management apparatus of FIG. 10, according to an exemplary embodiment of the present invention.

FIG. 12 is a flowchart of a method of managing data contained in a printing data file in the data management apparatus of FIG. 10, according to an exemplary embodiment of the present invention. The method comprises decrypting locality information using the first authentication key; and decrypting secured data using the second authentication key only if the decrypted locality information matches locality information obtained by the locality information acquisition unit 1018 (operations 1210 through 1226).

In operation 1210, the metadata extractor 1010 extracts metadata from a printing data file, and the metadata notification unit 1012 notifies a user of contents of the extracted metadata.

The data management apparatus of FIG. 10 receives a command of decryption from the user in operation 1212, and the authentication key input unit 1014 receives the first authentication key and the second authentication key from the user in operation 1214.

The locality information decryption unit 1016 decrypts locality information using the received first authentication key in operation 1216, and the locality information acquisition unit 1018 obtains locality information of a location where the locality information decryption unit 1016 is located or where the locality information acquisition unit 1018 is located in operation 1218.

The examiner 1020 determines whether the same locality information exists between the obtained locality information and the decrypted locality information in operation 1220. If it is determined by the examiner 1020 that the same locality information exists, the file decryption unit 1024 generates printing data by decrypting secured data using the received second authentication key in operation 1222. The image forming unit 1028 prints the generated printing data in operation 1224.

If it is determined by the examiner 1020 in operation 1220 that the same locality information does not exist, the user interface unit 1022 notifies the user that the secured data cannot be decrypted in operation 1226.

The flowchart illustrated in FIG. 12 describes an exemplary process of printing printing data contained in a received printing data file comprising metadata, encrypted locality information, and encrypted printing data.

If the received printing data file comprises non-encrypted locality information and non-encrypted printing data, a process of printing printing data contained in the received printing data file may comprise extracting locality information from the received printing data file; obtaining locality information of a location where the printing is performed; determining whether the same locality information exists between the extracted locality information and the obtained locality information; printing the printing data if it is determined that the same locality information exists; and notifying a user that the printing data cannot be printed if it is determined that the same locality information does not exist.

Figure 13:
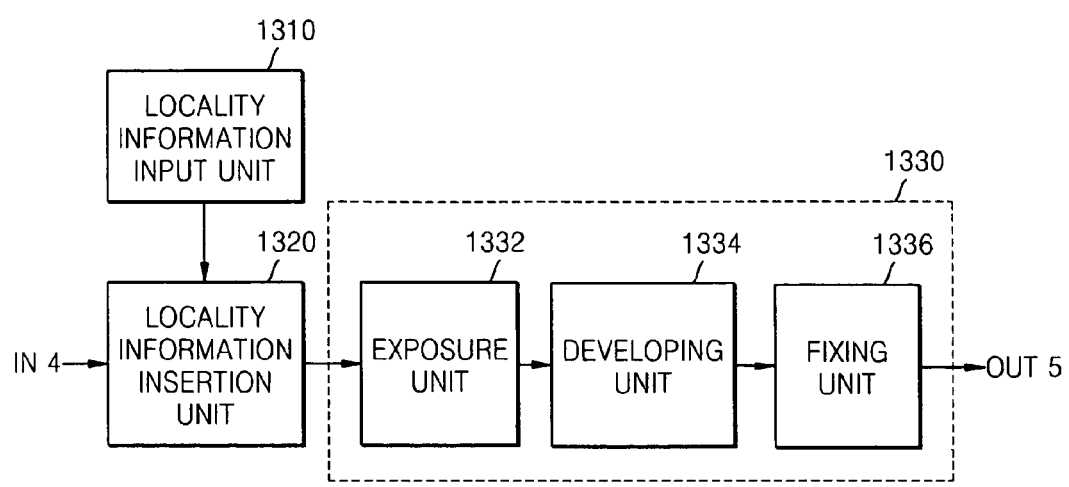
FIG. 13 is a block diagram of a data management apparatus showing how secured documents are created according to an exemplary embodiment of the present invention.

FIG. 13 is a block diagram of a data management apparatus for explaining how to create a secured document, according to an exemplary embodiment of the present invention. The data management apparatus of FIG. 13 may include a locality information input unit 1310, a locality information insertion unit 1320, and an image forming unit 1330. The image forming unit 1330 copmrises an exposure unit 1332, a developing unit 1334, and a fixing unit 1336.

In more detail, FIG. 13 is a detailed block diagram of a secured document creation apparatus creating a secured document managed by the data management apparatus of the current embodiment. Here, IN4 denotes received printing data.

In a host device (not shown) and an image forming device (not shown) connected to the host device via a network, the image forming device may receive the printing data IN4 from the host device and print the received printing data IN4. Here, the printed result is a document.

The image forming device may be a printing device, such as a printer, or an MFP having a printing function. The locality information input unit 1310, the locality information insertion unit 1320, and the image forming unit 1330 may be included in the image forming device.

The locality information input unit 1310 transmits locality information to the locality information insertion unit 1320.

A secured document managed by the data management apparatus of the current embodiment contains input locality information. The input locality information may contain at least one of locality information of a location where the printing data IN4 is generated and locality information of a location where the printing data IN4 is printed.

The locality information of the location where the printing data IN4 is generated may be locality information of the host device. The printing data IN4 can be generated in a target device.

The locality information of the location where the printing data IN4 is printed may be locality information of the image forming device. The printing data IN4 can be printed in a target forming device.

The input locality information may contain at least one of locality information (hereinafter, first determined information) of a location determined in advance in correspondence with the location where the printing data IN4 is generated and locality information (hereinafter, second determined information) of a location determined in advance in correspondence with the location where the printing data IN4 is printed.

For example, it is assumed that the target device is one of a plurality of host devices located on the third floor of the building A and the host devices are connected to host devices located in buildings B and C via the network (WWW). In addition, it is assumed that the company works in the building A is a subsidiary company of a company working in the building B and a competitor of a company working in the building C.

In this case, the first determined information may be locality information of the target device (hereinafter, information a), locality information of a certain host device located on the fourth floor of the building A (hereinafter, information b), locality information of all host devices located on the third and fourth floors of the building A (hereinafter, information c), or the information a and the information c.

In order for the locality information input unit 1310 to receive locality information containing both the information a and locality information of another host device, a predetermined host device must be defined in advance for each target device. For example, to contain both the information a and the information b in the locality information. received by the locality information input unit 1310, when the target device is the host device located on the third floor of the building A, the host device located on the fourth floor of the building A must be defined in advance in correspondence with the target device.

Likewise, if a certain host device located in the building B is defined in correspondence with the target device when the target device is located in the building A, the locality information input unit 1310 may transmit locality information containing locality information of all host devices located in the building B to the locality information insertion unit 1320 when the printing data IN4 is generated in the building A.

Thus, if other location is defined in advance in correspondence with the location where the printing data is generated besides the location where the printing data is generated, the locality information input unit 1310 may transmit locality information containing the locality information of the location where the printing data is generated and locality information of other location to the locality information insertion unit 1320.

All the descriptions about the first determined information can be applied to the second determined information in the same manner. Thus, if other location is defined in advance in correspondence with the location where the printing is performed besides the location where the printing is performed, the locality information input unit 1310 may transmit locality information containing the locality information of the location where the printing is performed and locality information of other location to the locality information insertion unit 1320.

Locality information of a host device and/or an image forming device may be information on an IP address of the host device and/or the image forming device. However, because the IP address can be easily modified, the locality information of the host device and/or the image forming device is more preferably information on a MAC address.

The locality information input unit 1310 may transmit received locality information or obtained locality information to the locality information insertion unit 1320. That is, the locality information input unit 1310 may receive locality information from the outside and transmit the received locality information to the locality information insertion unit 1320. Thus, the locality information input unit 1310 works as a buffer.

The received locality information is locality information directly input to the locality information input unit 1310 by a user. The locality information input unit 1310 transmits the received locality information to the locality information insertion unit 1320. Here, the user may input locality information of a target device or a target forming device to the locality information input unit 1310 or input locality information without concerning with the target device or the target forming device.

If the user wants to input the locality information of the target device or the target forming device to the locality information input unit 1310, the user may search for locality information of the target device or the target forming device in the network (WWW: world wide web) through Internet 450 and input the search result to the locality information input unit 1310, as illustrated in FIG. 4.

The obtained locality information is locality information obtained by the locality information input unit 1310 from the outside without the user's input. To obtain the locality information, the data management apparatus of the current embodiment may include a locality information creator (not shown) as illustrated in FIG. 4.

The locality information creator creates locality information of the target device or the target forming device. The locality information creator may be included in the GPS satellite 410 or the cell phone antenna 440.

For example, the locality information creator included in the GPS satellite 410 correctly detects a location of the target device or the target forming device on the earth and creates information on the detected location. In this case, the target device or the target forming device may include a GPS receiver (not shown). The GPS receiver receives the created information on the detected location from the GPS satellite 410, as locality information and works as the locality information input unit 1310 transmitting the received locality information to the locality information insertion unit 1320. In this case, the GPS receiver may directly receive the locality information from the GPS satellite 410 or may receive the locality information from the GPS satellite 410 via an antenna 420 connected to the target device or the target forming device.

Likewise, the locality information creator included in the cell phone antenna 440 correctly detects a location of the target device or the target forming device in a cell phone network and creates information on the detected location. The cell phone network is constructed of a plurality of cells, and a cell phone antenna included in each cell has its unique cell ID. Thus, the locality information creator included in the cell phone antenna 440 of a cell in which the target device or the target forming device is located outputs a unique cell ID of the cell as locality information of the target device or the target forming device. The locality information input unit 1310 included in the target device or the target forming device receives the created locality information and transmits the received locality information to the locality information-insertion unit 1320.

Even if the locality information creator included in the GPS satellite 410 or the cell phone antenna 440 creates the locality information of the target device or the target forming device, the locality information input unit 1310 can transmit locality information including the created locality information and locality information of other host devices or image forming devices to the locality information insertion unit 1320. To do this, other host device may be defined in advance in correspondence with each target device. Likewise, other image forming device may be defined in advance in correspondence with each target forming device.

For example, if locality information of a location defined in advance in correspondence with the location where the printing data IN4 is generated (hereinafter, extended locality information) exists for the locality information of the location where the printing data IN4 is generated (hereinafter, initial locality information), and if the extended locality information and the initial locality information are databased and stored in advance, even when the locality information created by the locality information creator contains only the initial locality information, the locality information input unit 1310 can transmit the extended locality information to the locality information insertion unit 1320. The extended locality information may or may not contain the initial-locality information.

The locality information insertion unit 1320 inserts the received locality information into the printing data IN4. Here, the locality information insertion unit 1320 may insert the locality information into the printing data IN4 using watermarking. The watermarking is a copy prevention technique suggested to prevent illegal copy and is used to prevent various literal contents and digital contents from being duplicated without authorization.

In this case, the locality information insertion unit 1320 can use various watermarking techniques such as a least significant bit (LSB) modulation technique. The printing data IN4 may not be damaged by the inserted locality information.

The image forming unit 1330 prints the printing data IN4 into which the locality information is inserted on a printing medium. The printing medium has an inclusive concept including paper and over-head projector (OHP) film, and the image forming unit 1330 outputs a document which is a concrete physical object. Here, OUT5 denotes the printed document. This document is referred to as a secured document.

If locality information is watermarked and inserted into the printing data IN4 by the locality information insertion unit 1320, the locality information on the document OUT5 cannot be perceived by naked eyes. Thus, even a person who tries to illegally carry a secured document off premises cannot perceive that locality information is inserted into the secured document.

If locality information is watermarked and inserted, the locality information can exist on both a portion showing printing data and a marginal portion of a secured document. Thus, even if a portion of the secured document is torn or scratched, the secured document can still have the locality information.

The image forming unit 1330 may include the exposure unit 1332, the developing unit 1334, and the fixing unit 1336. The exposure unit 1332 forms an electrostatic latent image by exposing a laser beam on an exposure medium according to the printing data IN4 into which the locality information is inserted, the developing unit 1334 generates a developed latent image by developing the formed electrostatic latent image, and the fixing unit 1336 prints a document based on the printing data IN4 into which the locality information is inserted by fixing the generated developed latent image on a printing medium.

Figure 14:
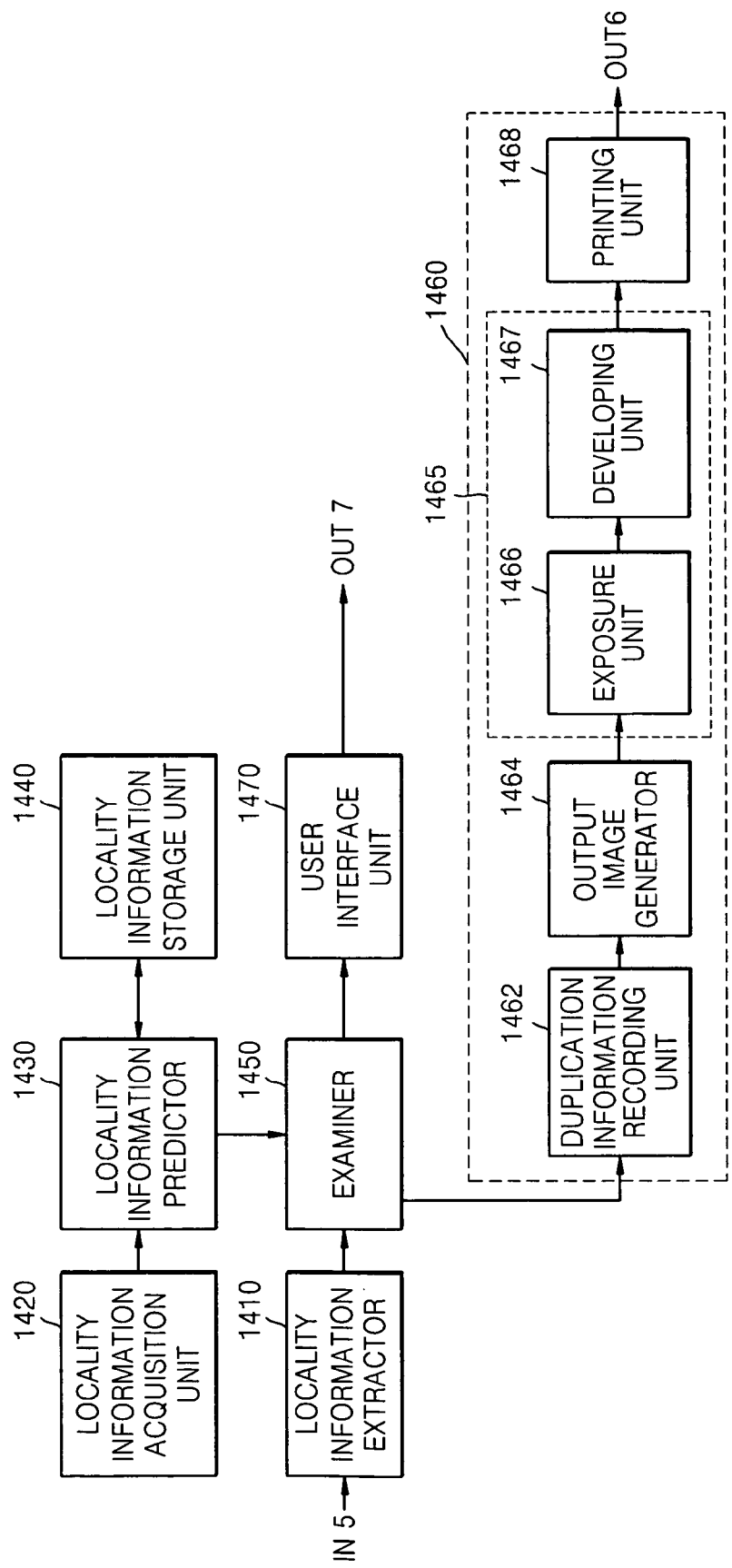
FIG. 14 is a block diagram of a data management apparatus illustrating how data contained in a secured document is managed according to an exemplary embodiment of the present invention.

FIG. 14 is a block diagram of a data management apparatus for explaining how to manage data contained in a secured document, according to an exemplary embodiment of the present invention. The data management apparatus of FIG. 14 includes a locality information extractor 1410, a locality information acquisition unit 1420, a locality information predictor 1430, a locality information storage unit 1440, an examiner 1450, a duplication unit 1460, and a user interface unit 1470.

The duplication unit 1460 includes a duplication information recording unit 1462, an output image generator 1464, an image forming unit 1465, and a printing unit 1468. The duplication unit 1460 may be implemented by a laser beam printer (LBP), an inkjet printer, a thermal printer, or any other suitable device. The image forming unit 1465 typically comprises an exposure unit 1466 and a developing unit 1467.

All of the locality information extractor 1410 through the user interface unit 1470 may be included in an image forming device. In particular, they may be included in a copy machine, a scanner, or an MFP. Here, the MFP may have a copy or scanning function. Thus, since a common function of the copy machine, the scanner, and the MFP is a function of copying information contained in a document, an image forming device having the copy function can be called an information duplication device.

IN5 denotes a document provided to an information duplication device, that is, the locality information extractor 1410. In more detail, IN5 denotes a document to be duplicated and may or may not be a secured document. Hereinafter, a non-secured document is called a general document.

If a general document is provided to the information duplication device, the information duplication device may or may not duplicate information contained in the general document. However, if a secured document is provided to the information duplication device, the information duplication device does not duplicate information contained in the secured document when the information duplication device determines that its own locality information is locality information of a location where the information contained in the secured document cannot be duplicated. A method of managing a secured document according to an exemplary embodiment of the present invention will now be described in more detail.

The locality information extractor 1410 extracts locality information contained in the document IN5 by reading the document IN5. If the document IN5 is a general document, the locality information extractor 1410 cannot extract locality information of the document IN5. That is, the locality information extractor 1410 can extract locality information of the document IN5 only if the document IN5 is a secured document, i.e., a document containing locality information.

Although IN5 may be a secured document or a general document, it is assumed for the convenience of description that IN5 is the secured document OUT5. The locality information extractor 1410 may read the document IN5 by scanning it.

The extracted locality information may be locality information of a location a pre-defined location in correspondence with a location where the document IN5 is created. The location where the document IN5 is created is the location where the printing data IN4 contained in the document IN5 is generated. That is, the extracted locality information may contain the initial locality information or the extended locality information with the initial locality information.

The locality information acquisition unit 1420 obtains its own locality information. That is, the locality information acquisition unit 1420 obtains locality information of an information duplication device in which the locality information acquisition unit 1420 is included. Here, the locality information acquisition unit 1420 obtains the locality information from the outside without a user's input.

To do this, the locality information creator described above can also create the locality information of the information duplication device. As described above, the locality information creator may be included in the GPS satellite 410 or the cell phone antenna 440.

For example, the locality information creator included in the GPS satellite 410 correctly detects a location of the information duplication device on the earth and creates information on the detected location. In this case, the information duplication device may include a GPS receiver (not shown). The GPS receiver works as the information duplication device by obtaining the created information on the detected location from the GPS satellite 410 as locality information.

Likewise, the locality information creator included in the cell phone antenna 440 correctly detects a location of the information duplication device in a cell phone network and creates information on the detected location. Thus, the locality information creator included in the cell phone antenna 440 of a cell in which the information duplication device is located outputs a unique cell ID of the cell as locality information of the information duplication device. The locality information acquisition unit 1420 included in the information duplication device obtains the created locality information.

The locality information acquisition unit 1420 may obtain locality information without a direct input from the user because incorrect locality information can be obtained when the locality information acquisition unit 1420 obtains its own locality information through the user's input.

The locality information predictor 1430 provides to the examiner 1450 locality information that must be contained in the document IN5 in order for the information contained in the document IN5 to be duplicated. That is, the locality information predictor 1430 predicts a value of locality information that must be contained in the document INS in order for the information contained in the document IN5 input to the locality information extractor 1410 to be duplicated. To do this, locality information, which is predicted to be inserted into the document IN5, may be defined in advance by matching each obtained locality information. The locality information storage unit 1440 stores the predicted locality information matching each obtained locality information. However, according to the current embodiment, the locality information predictor 1430 and the locality information storage unit 1440 may not be included in the data management apparatus of FIG. 14. In this case, the locality information obtained by the locality information acquisition unit 1420 is directly transmitted to the examiner 1450.

The examiner 1450 determines whether the same locality information exists between the locality information extracted by the locality information extractor 1410 and the locality information obtained by the locality information acquisition unit 1420. For example, if the extended locality information is contained in the locality information inserted into the document IN5, the extended locality information exists in the locality information extracted by the locality information extractor 1410, and the examiner 1450 determines whether the obtained locality information exists in the extended locality nformation.

The obtained locality information may contain the locality information of the information duplication device. Furthermore, the obtained locality information may contain other pre-defined locality information in correspondence with the locality information of the information duplication device.

The duplication unit 1460 and the user interface unit 1470 operate in response to the result determined by the examiner 1450. In more detail, if it is determined as the determination result that the same locality information exists, the duplication unit 1460 works. If it is determined as the determination result that the same locality information does not exist, the user interface unit 1470 works.

The duplication unit 1460 duplicates the information contained in the document INS. The duplication unit 1460 may include the duplication information recording unit 1462, the output image generator 1464, the image forming unit 1465, and the printing unit 1468.

The duplication information recording unit 1462 stores the extracted locality information. However, the duplication information recording unit 1462 may not be included in the duplication unit 1460 according to the current embodiment. The output image generator 1464 generates an output image, which is an image of a result read by the locality information extractor 1410.

The image forming unit 1465 forms an image of the generated output image. The printing unit 1468 prints the formed image on a printing medium.

If the duplication unit 1460 is implemented by a LBP as described above, the image forming unit 1465 may include an exposure unit 1466 and a developing unit 1467. In this case, the exposure unit 1466 generates an electrostatic latent image by scanning a laser beam on an exposure medium, and the developing unit 1467 forms an image by developing the generated electrostatic latent image. The printing unit 1468 prints the formed image as a document by fixing the formed image on the printing medium.

If the duplication unit 1460 is implemented by an inkjet printer, the image forming unit 1465 may include an ink nozzle controller (not shown). In this case, the ink nozzle controller generates a control signal for controlling the amount of ink ejection in accordance with the generated output image. The printing unit 1468 prints the formed image as a document by ejecting ink on the printing medium in response to the control signal.

If the duplication unit 1460 is implemented by a thermal printer, the image forming unit 1465 may include a thermal head controller (not shown). In this case; the thermal head controller generates a control signal for controlling the degree of heat in accordance with the generated output image. The printing unit 1468 prints the formed image as a document by heating the printing medium in response to the control signal.

If the information duplication device including the duplication unit 1460 is a copy machine or an MFP having a copy function, the duplication unit 1460 duplicates the information by copying the document IN5. In this case, OUT6 denotes a printing medium obtained by copying the document IN5.

If the information duplication device including the duplication unit 1460 is a scanner or an MFP having a scanning function, the duplication unit 1460 duplicates the information by scanning the document IN5. In this case, OUT6 denotes scan data having the information contained in the document IN5.

In more detail, if the information duplication device including the duplication unit 1460 is a scanner or an MFP having a scanning function, the duplication unit 1460 may include a scanning unit (not shown), a scan data acquisition unit (not shown), and a scan data copy unit (not shown).

The scanning unit scans the document 1N5, and the scan data acquisition unit obtains scan data generated by scanning the document IN5. The scan data copy unit can copy the obtained scan data.

The user interface unit 1470 informs the user that the document IN5 cannot be duplicated. OUT7 denotes the informed contents. An illegal copy try notification unit (not shown) may be connected to the user interface unit 1470. If it is determined by the examiner 1450 that the same locality information does not exist, the illegal copy try notification unit may notify a host device or an image forming device located at a location indicated by the locality information extracted from the document INS that an illegal copy has been tried.

If the locality information is watermarked and inserted into the document INS, the inserted locality information can be prevented from being deliberately damaged in the document IN5 because even a person who tries an illegal copy cannot perceive the existence of the locality information.

Figure 15:
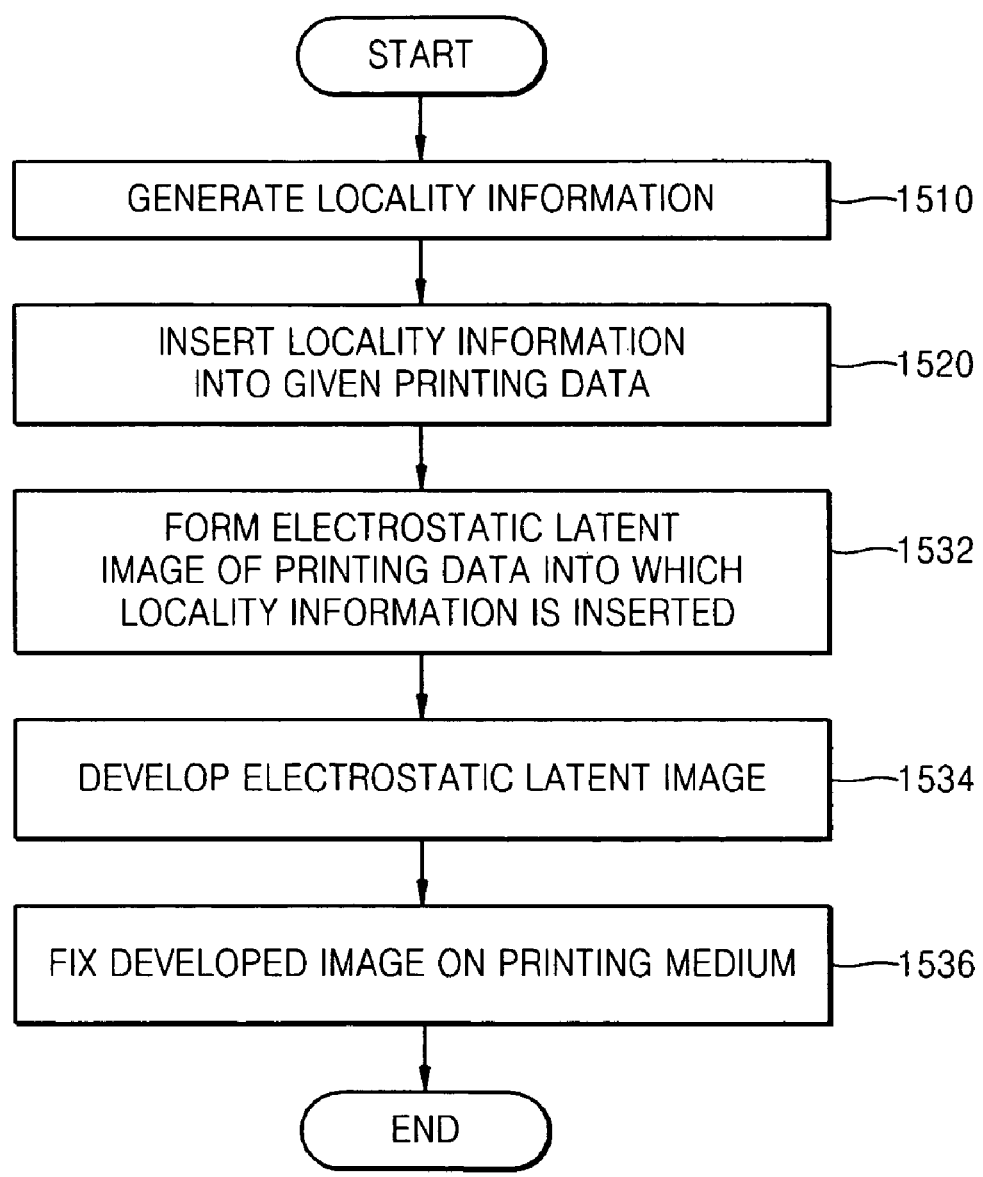
FIG. 15 is a flowchart of a method of creating a secured document in the data management apparatus of FIG. 13, according to an exemplary embodiment of the present invention.

FIG. 15 is a flowchart of a method of creating a secured document in the data management apparatus of FIG. 13, according to an exemplary embodiment of the present invention. The method comprises inserting locality information into printing data; and printing the printing data into which the locality information is inserted. In more detail, FIG. 13 is a detailed block diagram of a data management apparatus creating a secured document using the data management method according to the current embodiment.

In operation 1510, the locality information input unit 1310 receives locality information created by the locality information creator and transmits the received locality information to the locality information insertion unit 1320. However, the locality information input unit 1310 may transmit locality information directly input by a user to the locality information insertion unit 1320.

The locality information insertion unit 1320 inserts the received locality information into printing data IN4 in operation 1520. The image forming unit 1330 prints the printing data into which the locality information is inserted on a printing medium as a document.

In more detail, in operation 1532, the exposure unit 1332 of the image forming unit 1330 forms an electrostatic latent image of the printing data into which the locality information is inserted. The developing unit 1334 of the image forming unit 1330 generates an image by developing the formed electrostatic latent image in operation 1534. The fixing unit 1336 of the image forming unit 1330 fixes the generated image on the printing medium in operation 1536. By doing this, a secured document managed by a data management apparatus according to an embodiment of the present invention is created.

Figure 16:
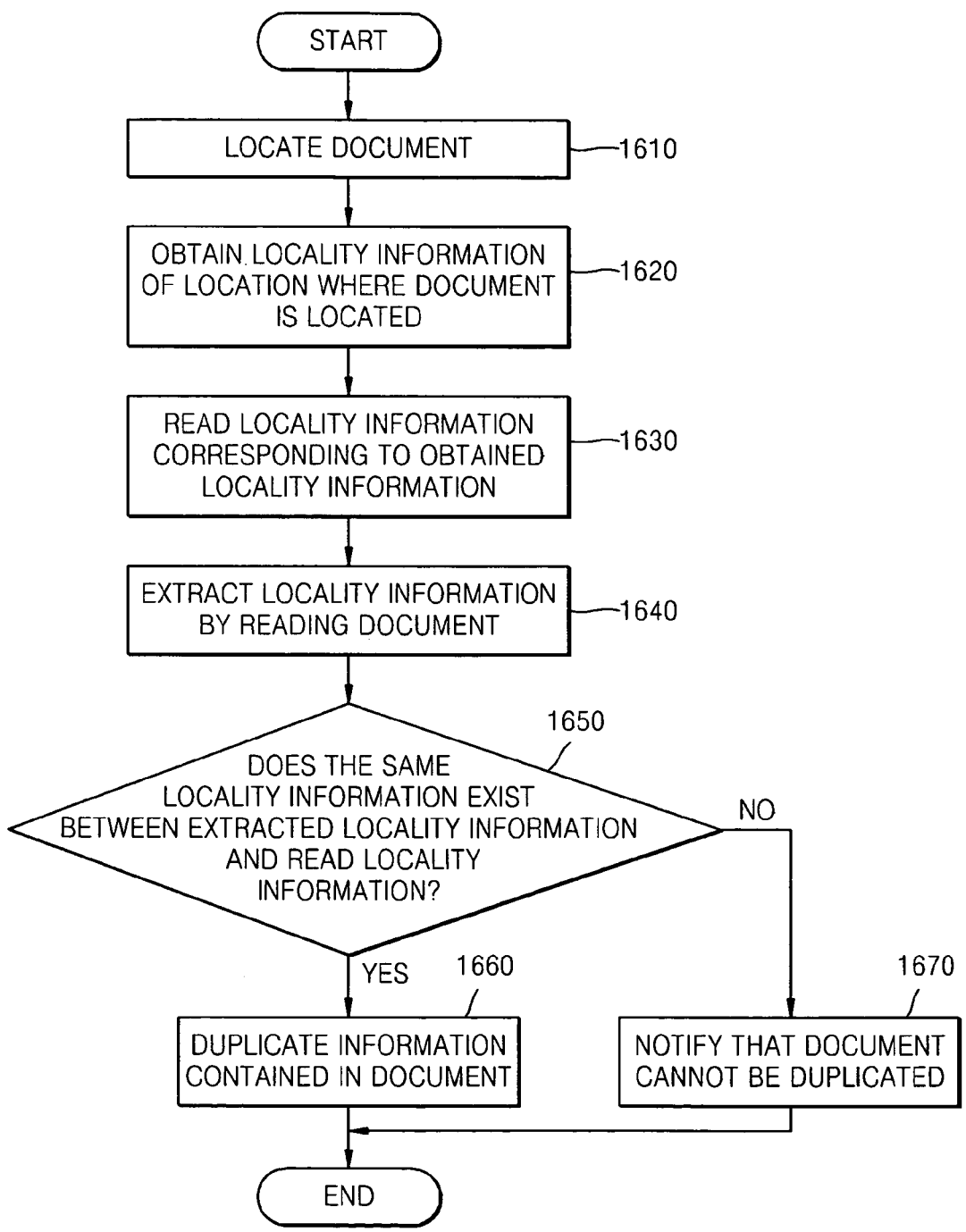
FIG. 16 is a flowchart of a method of managing data contained in a secured document in the data management apparatus of FIG. 14, according to an exemplary embodiment of the present invention.

FIG. 16 is a flowchart of a method of managing data contained in a secured document in the data management apparatus of FIG. 14, according to an exemplary embodiment of the present invention. The method comprises determining whether the same locality information exists between locality information extracted from a document and stored locality information (operations 1610 through 1650); and responding in accordance with the determination result (operations 1660 and 1670).

A document IN5 is prepared for the locality information extractor 1410 in operation 1610. When the document IN5 is prepared, the locality information acquisition unit 1420 obtains locality information of a location where the document IN5 is prepared in operation 1620. The locality information predictor 1430 reads locality information corresponding to the obtained locality information from the locality information storage unit 1440 in operation 1630.

The locality information extractor 1410 extracts locality information from the document IN5 in operation 1640, and the examiner 1450 determines-in operation 1650 whether the same locality information exists between the extracted locality information and, the read-locality information.

If it is determined in operation 1650 that the same locality information exists, the duplication unit 1460 duplicates information contained in the document IN5 in operation 1660.

If it is determined in operation 1650 that the same locality information does not exist, the user interface unit 1470 notifies a user that the document IN5 cannot be duplicated in operation 1670.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. Also, functional programs, codes, and code segments for accomplishing the present invention can be easily construed by programmers skilled in the art to which the present invention pertains.

As described above, in a data management method and apparatus according to an embodiment of the present invention, by decrypting secured data contained in a printing data file only if locality information extracted from the printing data file matches stored locality information, an illegal outflow of printing data contained in the printing data file can be prevented although anyone can access the printing data file via a network. Furthermore, in a data management method and apparatus according to an embodiment of the present invention, by differentiating an authentication key used for encrypting locality information from an authentication key used for encoding printing data, contents of the printing data can be secured even if one of the two authentication keys is illegally carried out. In addition, in a data management method and apparatus according to an exemplary embodiment of the present invention, by managing a printing data file containing metadata, a user can know schematic information on printing data contained in the printing data file before secured data is decrypted.

Moreover, in a data management method and apparatus according to an exemplary embodiment of the present invention, by allowing information contained in a secured document to be duplicated only in a specific area, an illegal outflow of the secured document can be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A data management method comprising:
    extracting locality information added to given printing data;
    comparing the extracted locality information to prepared locality information; and
    printing the printing data if the extracted locality information matches the prepared locality information,
    wherein the extracted locality information includes an initial locality information and an extended locality information, the initial locality information is locality information of a location where the given printing data is located or a location determined by a user, and the extended locality information is locality information of one or more additional predetermined locations that correspond with the initial locality information where the printing data is permitted to be printed.

2. The method of claim 1, wherein the extracted locality information is locality information of an area where the printing data can be printed.

3. The method of claim 1, wherein the prepared locality information is locality information of a location where the printing is performed.

4. The method of claim 1, wherein, if the extracted locality information does not match the obtained locality information, the printing data cannot be printed.

5. The method of claim 4, wherein the data management method notifies a user that the printing data cannot be printed.

6. The method of claim 1, wherein the printing data is secured data to which an encryption scheme is applied.

7. The method of claim 6, wherein the printing comprises:
    decrypting the secured data if the extracted locality information matches the prepared locality information; and
    printing the decrypted secured data.

8. The method of claim 7, wherein the locality information added to the given printing data is secured by being encrypted.

9. The method of claim 7, wherein, in the extraction, the extraction is performed by decrypting the locality information added to given the printing data using a given first authentication key, and the locality information added to the given printing data has been encrypted using the first authentication key, and
    in the printing, the secured data is decrypted using a given second authentication key if the extracted locality information matches the prepared locality information, and the secured data is printing data encrypted using the second authentication key, and
    the second authentication key is different from the first authentication key.

10. The method of claim 7, wherein metadata is added to the given printing data, and the metadata contains arbitrary information on the given printing data.

11. A data management apparatus comprising:
    a locality information extractor for extracting locality information added to given printing data;
    an examiner for determining whether the extracted locality information matches prepared locality information; and
    an image forming unit for printing the printing data if the extracted locality information matches the prepared locality information;
    wherein the extracted locality information includes an initial locality information and an extended locality information, the initial locality information is locality information of a location where the given printing data is located or a location determined by a user, and the extended locality information is locality information of one or more additional predetermined locations that correspond with the initial locality information wherein the printing data may be printed.

12. The apparatus of claim 11, wherein the extracted locality information is locality information of an area where the printing data can be printed.

13. The apparatus of claim 11, wherein the prepared locality information is locality information of a location where the image forming unit is located.

14. The apparatus of claim 11, wherein, if the extracted locality information does not match the obtained locality information, the printing data cannot be printed.

15. The apparatus of claim 14, wherein the data management apparatus notifies a user that the printing data cannot be printed.

16. The apparatus of claim 11, wherein the printing data is secured data to which an encryption scheme is applied.

17. The apparatus of claim 16, further comprising:
a file decryption unit decrypting the secured data if the extracted locality information matches the prepared locality information,
wherein the image forming unit prints the decrypted secured data.

18. A non-transitory computer readable recording medium storing a computer program for executing a data management method comprising:
extracting locality information added to given printing data;
comparing the extracted locality information to prepared locality information; and
printing the printing data if the extracted locality information matches the prepared locality information,
wherein the extracted locality information includes an initial locality information and an extended locality information, the initial locality information is locality information of a location where the given printing data is located or a location determined by a user, and the extended locality information is locality information of one or more additional predetermined locations that correspond with the initial locality information wherein the printing data may be printed.

19. A data management apparatus comprising:
a locality information extractor for extracting locality information by reading a given document;
an examiner for determining whether the extracted locality information matches pre-stored locality information; and
a duplication unit for duplicating information contained in the document in response to the determination result,
wherein the extracted locality information is locality information of a location defined in correspondence with a location where the document is located or created; and
wherein the extracted locality information includes an initial locality information and an extended locality information, the initial locality information is locality information of a location where the given printing data is located or a location determined by a user, and the extended locality information is locality information of one or more additional predetermined locations that correspond with the initial locality information where the printing data is permitted to be printed.

20. The apparatus of claim 19, further comprising:
a locality information acquisition unit obtaining information of where the document is to be duplicated.

21. The apparatus of claim 19, wherein the duplication unit comprises:
an output image generator generating an output image, which is an image of the read result; and
an image forming unit forming an image of the generated output image.

22. The apparatus of claim 21, wherein the image forming unit uses an electrophotographic method, an inkjet method, or a thermal method.

23. The apparatus of claim 21, wherein the duplication unit further comprises a duplication information recording unit storing the extracted locality information.

24. The apparatus of claim 19, wherein the duplication unit duplicating the document by copying or scanning the document.

25. The apparatus of claim 19, wherein the extracted locality information can or cannot be perceived from the duplication result with a naked eye.

26. A data management method comprising:
extracting locality information by reading a given document;
determining whether the extracted locality information matches pre-stored locality information; and
duplicating the document if it is determined that the extracted locality information matches the pre-stored locality information,
wherein the extracted locality information is locality information of a location pre-defined in correspondence with a location where the document is located or locality information of a location pre-defined in correspondence with a location where the document is created; and
wherein the extracted locality information includes an initial locality information and an extended locality information, the initial locality information is locality information of a location where the given printing data is located or a location determined by a user, and the extended locality information is locality information of one or more additional predetermined locations that correspond with the initial locality information where the printing data is permitted to be printed.

27. The method of claim 26, further comprising:
notifying a user that the document cannot be duplicated if it is determined that the extracted locality information does not match the obtained locality information.

28. The method of claim 26, wherein:
said pre-stored locality information is obtained by obtaining locality information of where the document is to be duplicated, and
wherein, in the determination, it is determined whether the extracted locality information matches the obtained locality information.

29. The method of claim 26, wherein, in the duplication, the document is duplicated by copying or scanning the document.

30. The method of claim 26, wherein, the duplication comprises:
generating an output image, which is an image of the read result; and
forming an image of the generated output image.

31. The method of claim 30, wherein, in the generation, an electrophotographic method, an inkjet method, or a thermal method is used.

32. A non-transitory computer readable recording medium storing a computer program for executing a data management method comprising:
extracting locality information by reading a given document;
determining whether the extracted locality information matches pre-stored locality information; and
duplicating the document if it is determined that the extracted locality information matches the pre-stored locality information,
wherein the extracted locality information is locality information of a location pre-defined in correspondence with a location where the document is located or locality information of a location pre-defined in correspondence with a location where the document is created; and
wherein the extracted locality information includes an initial locality information and an extended locality information, the initial locality information is locality information of a location where the given printing data is located or a location determined by a user, and the extended locality information is locality information of one or more additional predetermined locations that correspond with the initial locality information where the printing data is permitted to be printed.

* * * * *